March 19, 1963   R. HOOKE ET AL   3,082,373
OPTIMIZING METHOD AND APPARATUS
Filed Jan. 29, 1959   11 Sheets-Sheet 1
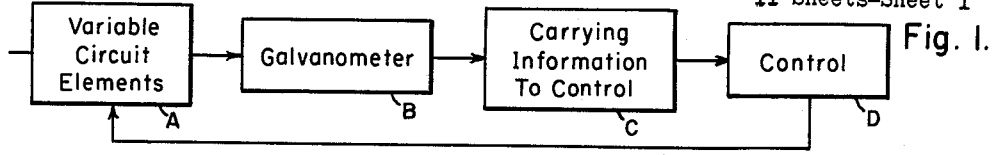
Fig. 1.
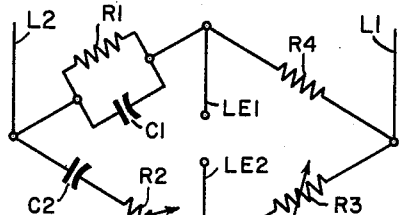
Fig. 2.
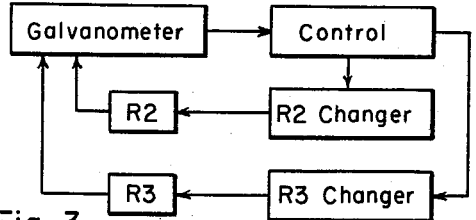
Fig. 3.
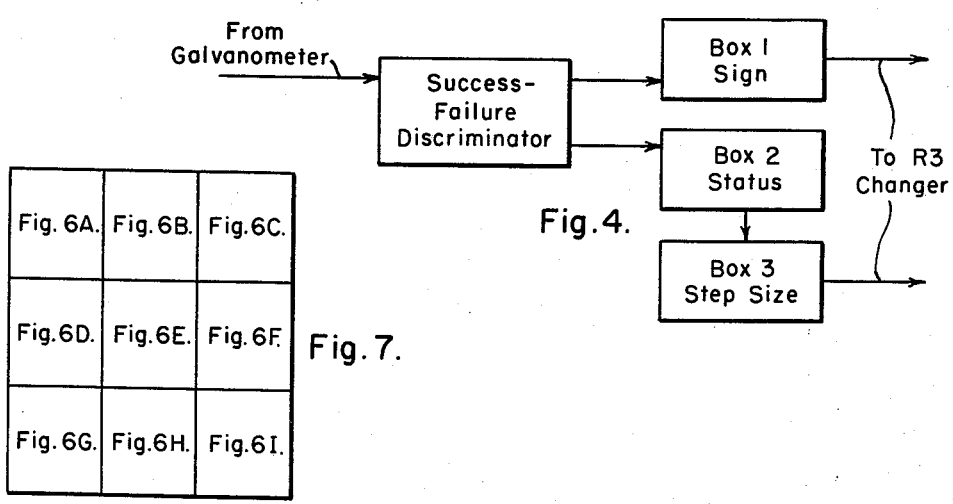
Fig. 4.
| Fig. 6A. | Fig. 6B. | Fig. 6C. |
| Fig. 6D. | Fig. 6E. | Fig. 6F. |
| Fig. 6G. | Fig. 6H. | Fig. 6I. |
Fig. 7.
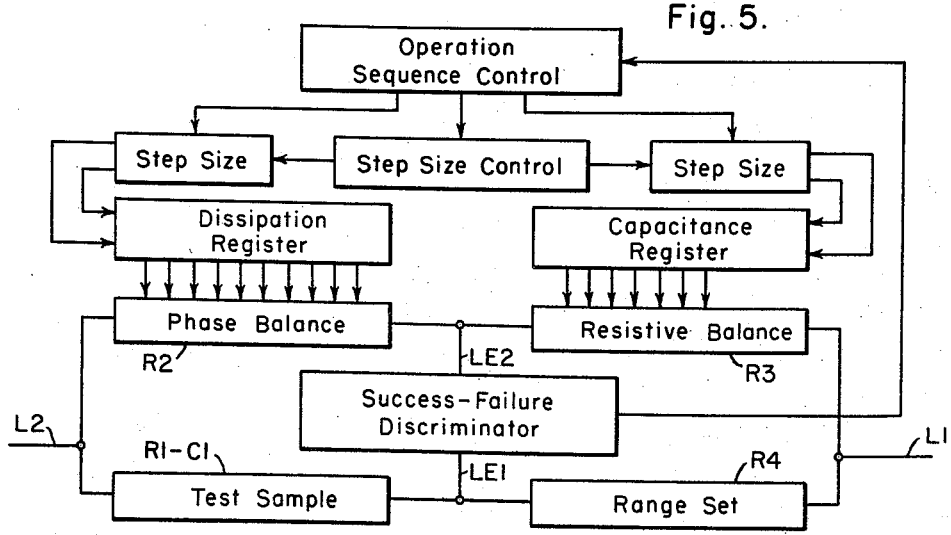
Fig. 5.

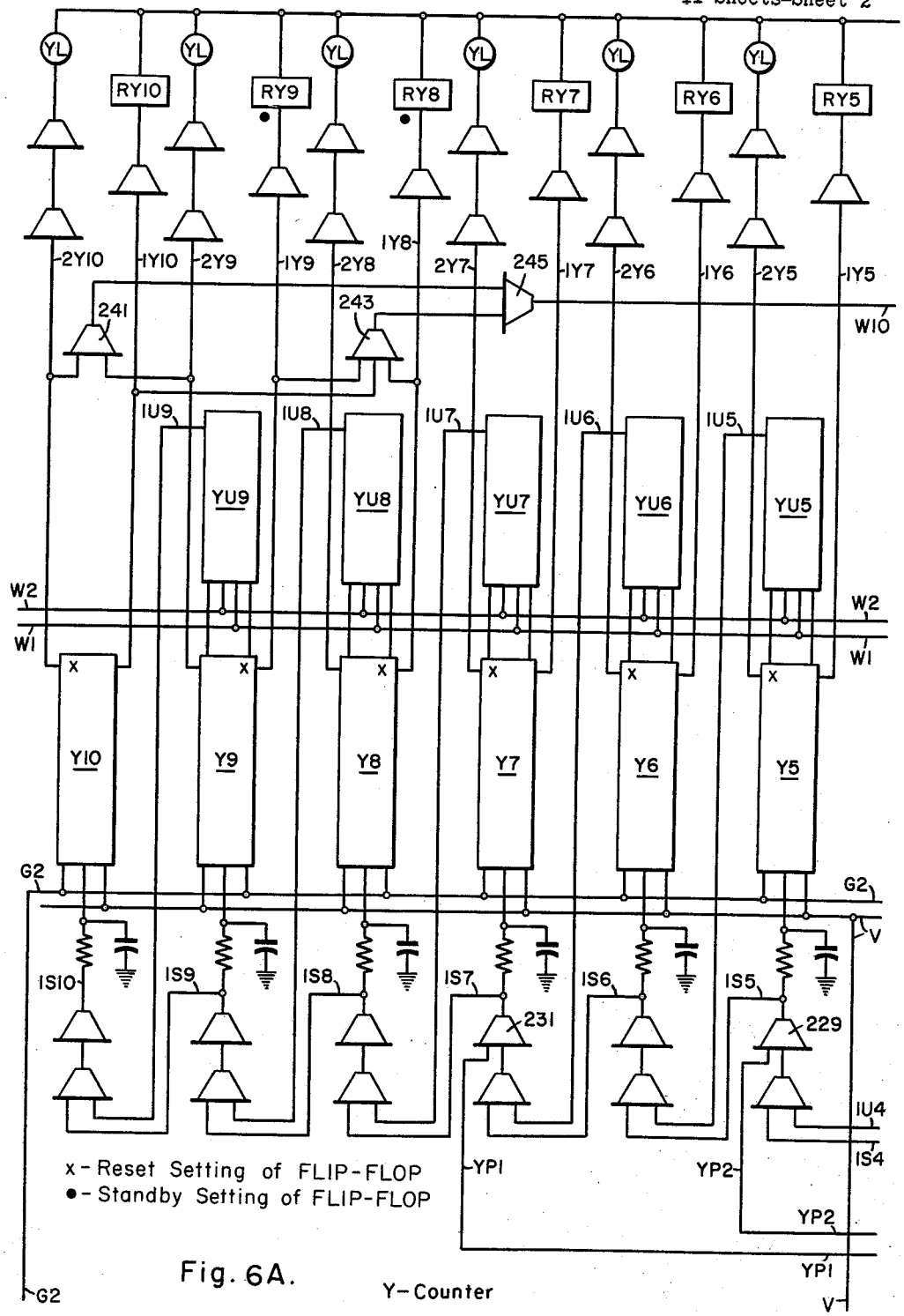

3,082,373
Patented Mar. 19, 1963

3,082,373
OPTIMIZING METHOD AND APPARATUS
Robert Hooke and Richard E. Wendt, Jr., Pittsburgh, Pa., assignors to Westinghouse Electric Corporation, East Pittsburgh, Pa., a corporation of Pennsylvania
Filed Jan. 29, 1959, Ser. No. 789,985
10 Claims. (Cl. 324—57)

This invention relates to the automation art and has particular relationship to optimizing apparatus. This invention relates to and incorporates by reference an application Serial No. 730,590, filed April 24, 1958, now Patent No. 3,044,701, to Robert Hooke et al. (hereinafter called Hooke application) and an application Serial No. 788,552, filed January 23, 1958, to Richard E. Wendt, Jr. (hereinafter called Wendt application), now abandoned.

In the present power distribution apparatus plants capacitors are produced at very high rates of the order of hundreds per day. The capacitors vary over a wide range in capacity and in dissipation factor and it is broadly an object of this invention to provide apparatus and a method for determining the capacity and dissipation factor for each capacitor with the rapidity demanded by the rate at which the capacitors are produced.

In accordance with the teachings of the prior art, the properties of a capacitor may be determined with an alternating-current bridge such as a Wien bridge. Such a bridge includes variable resistance and variable phase arms and may be balanced manually by varying each of the arms until the potential between the output terminals of the bridge is substantially zero. The setting of the variable phase arm at balance then is a measure of the dissipated factor and the setting of the resistance arm a measure of the capacity. But by manual balancing of the bridge at the rate demanded by the production of capacitors, even if it could be carried out, would subject the operators to mental pressure and would result in an excessive number of errors. Alternating-current bridges are sometimes included in regulators in which the bridge is balanced by a motor (see Sorensen 2,490,844, FIG. 8) but such regulation apparatus does not lend itself to capacitor measurement.

It is then an object of this invention to provide apparatus and a method for balancing an alternating-current bridge with the rapidity demanded by the rate of production of capacitors to be measured in the bridge.

An incidental object of this invention is to provide a novel alternating-current bridge particularly suitable for the testing of capacitors produced at a high rate but also having other uses.

In accordance with this invention the measurement of capacitors produced at a high rate is effected by optimizing of the general type disclosed in Hooke application. In accordance with a specific aspect of this invention an alternating-current bridge is provided in which the variable resistance arm and the variable phase arm are each made up of a plurality of impedances, specifically resistances, each of which is shunted by contacts. In the practice of this invention in its broader aspects, the contacts of each of the arms in its turn are selectively operated to vary the respective resistance and phase until a balance is obtained. The selective operation is automatic, each time responding to the difference between the last magnitude of the output voltage and the lowest output obtained during prior measurements.

Specifically, the resistance arm is varied first and then the phase arm is varied. In each case successive incremental changes of a first largest predetermined magnitude and of one polarity are first made in the arm being varied and the output voltage after each change is compared with the prior lowest output. So long as each change produces an improvement, that is, a decrease in output voltage, the changes continue of the same magnitude and polarity. When a change produces no decrease in output voltage the setting of the arm is reverted to its condition prior to the change, and a change of a second lower magnitude and of the opposite polarity is made and the output voltage compared with the voltage corresponding to the last lowest setting which had been retained. Changes of this magnitude and polarity are continued until the output voltage again shows no decrease then incremental changes of a still smaller magnitude and of the first polarity are made. The above described process continues for each arm until the incremental changes are of the smallest magnitude. Then the process is repeated with the other arm. The alternate setting with each arm and then the other arm continues until substantial balance is achieved.

The process is carried out at high speed and the measurement readily keeps up with the production rate. The bridge with the multi-impedance-element variable arms which are switched is an important feature of this invention because it assures that the measurement apparatus is of long life and does not require that the production be interrupted at intervals for repair of the bridge.

Following the nomenclature in the Hooke application each step in which an incremental change is made in either arm and an output voltage comparison carried out is called a move or trial. A move which results in an improvement is called a success, a move which results in no improvement is called a failure.

The novel features considered characteristic of this invention are disclosed generally above. This invention itself both as to its organization and as to its method of operation together with the objects and advantages thereof will be understood from the following description of a specific embodiment taken in connection with the accompanying drawings in which:

FIG. 1 is a block diagram for helping the understanding of this invention;

FIG. 2 is a circuit diagram of a Wien bridge showing how the various components are arranged in the practice of this invention;

FIGS. 3 4 and 5 are block diagrams for helping the understanding of this invention;

FIGS. 6A through 6I together constitute a circuit diagram of apparatus in accordance with this invention;

FIG. 7 shows the arrangement of FIGS. 6A through 6I; and

Figure 8:
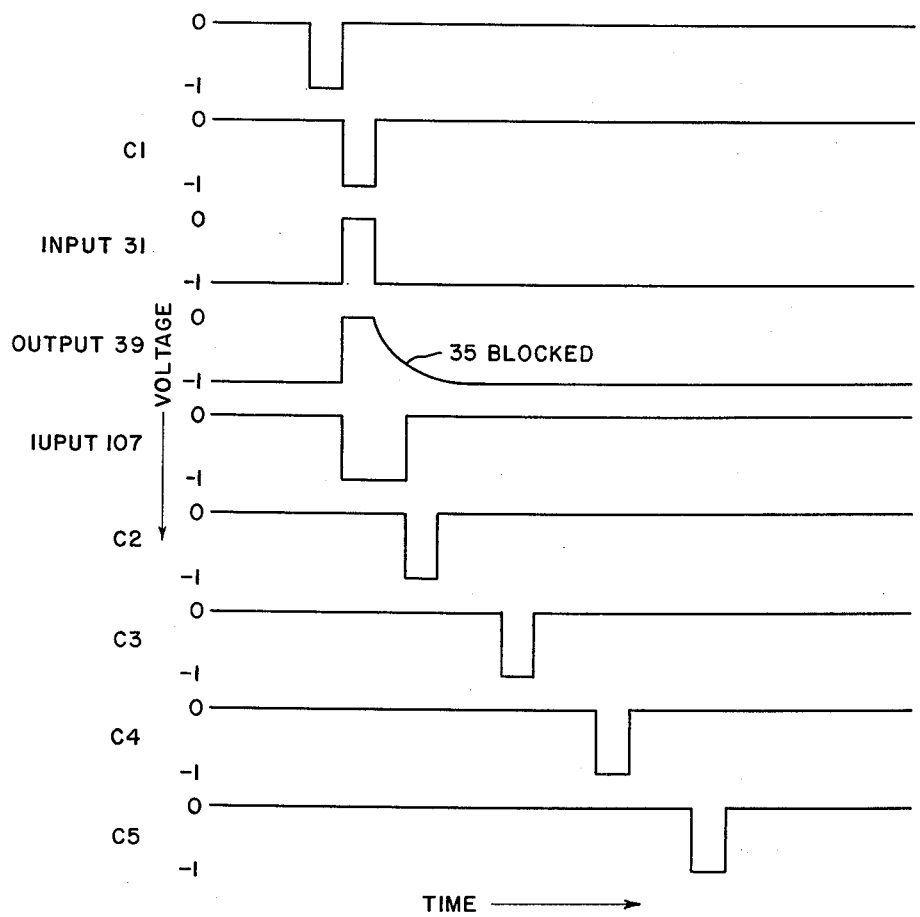

FIG. 8 is a graph showing the operation of the Clock Unit of the apparatus.

It is believed that the understanding of the invention will be helped by the following introductory comment:

THE OBJECT

The object of this invention is to provide automatic means for adjusting an alternating-current bridge network (specifically a Wien bridge) to secure a null output; to do this as rapidly as possible (preferably in less than 30 seconds); with a predetermined accuracy; with apparatus having long life; and for capacitors of various sizes having a wide range in capacitance and in dissipation factor.

PRIOR ART APPARATUS

Prior art automatic devices for balancing an A.-C. bridge are inadequate because (a) they do not have sufficient range, (b) their life depends on variable-resistance devices of relatively short life, and (c) they suffer from a conflict of stability and accuracy requirements because of unavoidable characteristics of cross-coupled control loops containing integrators.

THIS INVENTION

In accordance with the broader aspects of this invention optimizing apparatus and an optimizing method of the general type disclosed in the Hooke application are provided for securing a null balance of an A.-C. bridge network. Two manipulated variables produce changes in a single output quantity, which is to be brought to a well-defined minimum: zero. The manipulated variables interact in a complicated way. The output can be measured with considerable precision, as noise may be almost completely eliminated.

An A.-C. bridge, together with a device for balancing it, can be pictured schematically as in FIG. 1.

The galvanometer is in FIG. 1 a concrete representation of any component for deriving output from the bridge. A particular setting of the variable circuit elements A causes a certain reading on the galvanometer B; this information is carried by C to a control device D which in turn determines a new setting for A. This process continues until the reading at B is as near 0 as may be required. In the specific practice of this invention the variable circuit elements are resistances.

Our invention pertains to blocks A, C, D in FIG. 1. It will be described in terms of its solution of the problem of balancing a Wien bridge as shown in FIG. 2. This bridge includes a first arm including the test capacitor C1 of which the capacity is to be measured having an equivalent shunt resistance R1, a second arm including resistor R4 which is to be set in accordance with the range of capacity of C1, a variable resistance arm including variable resistance R3, and a variable phase arm including capacitor C2 and variable resistor R2.

Figure 6B:
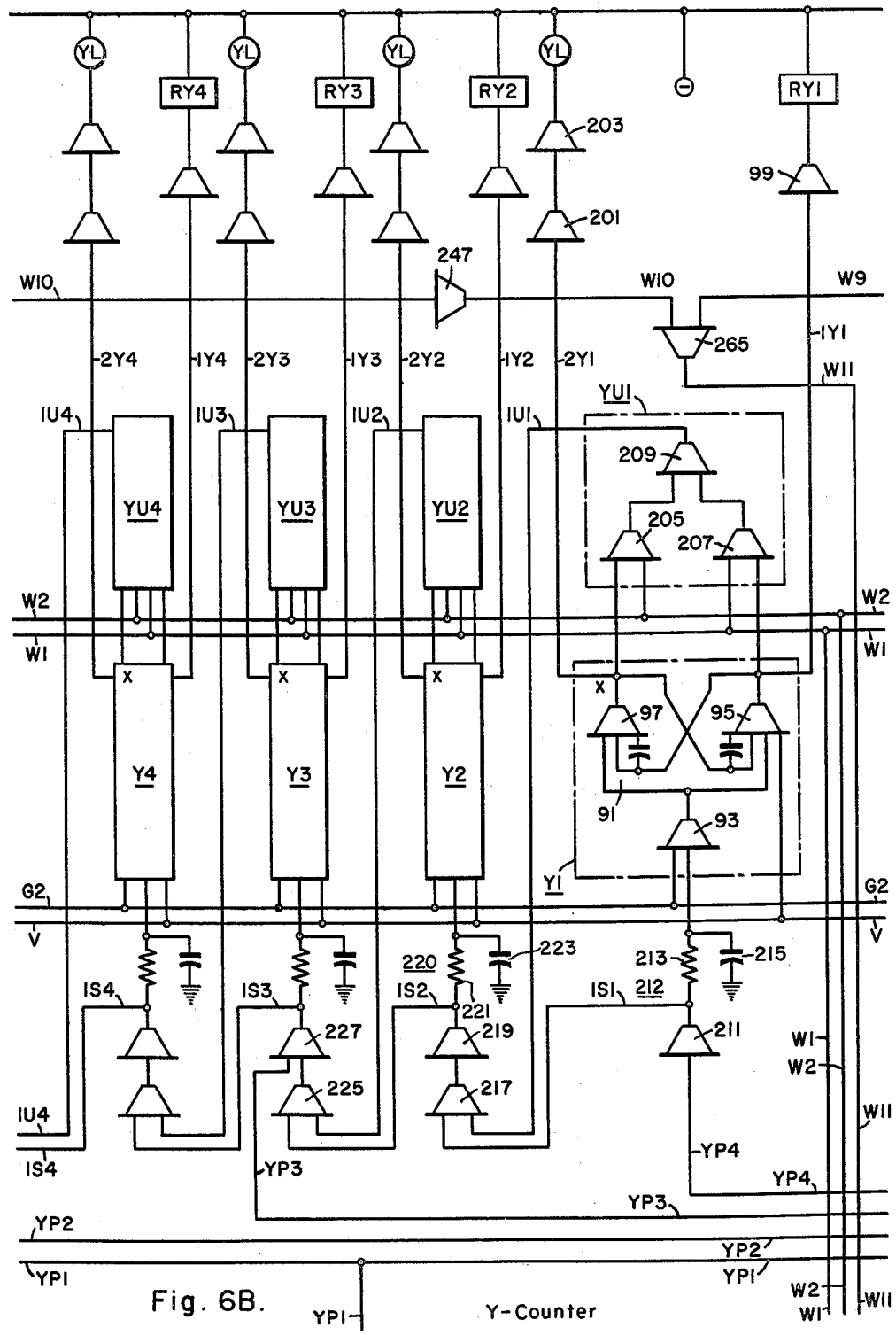
Figure 6C:
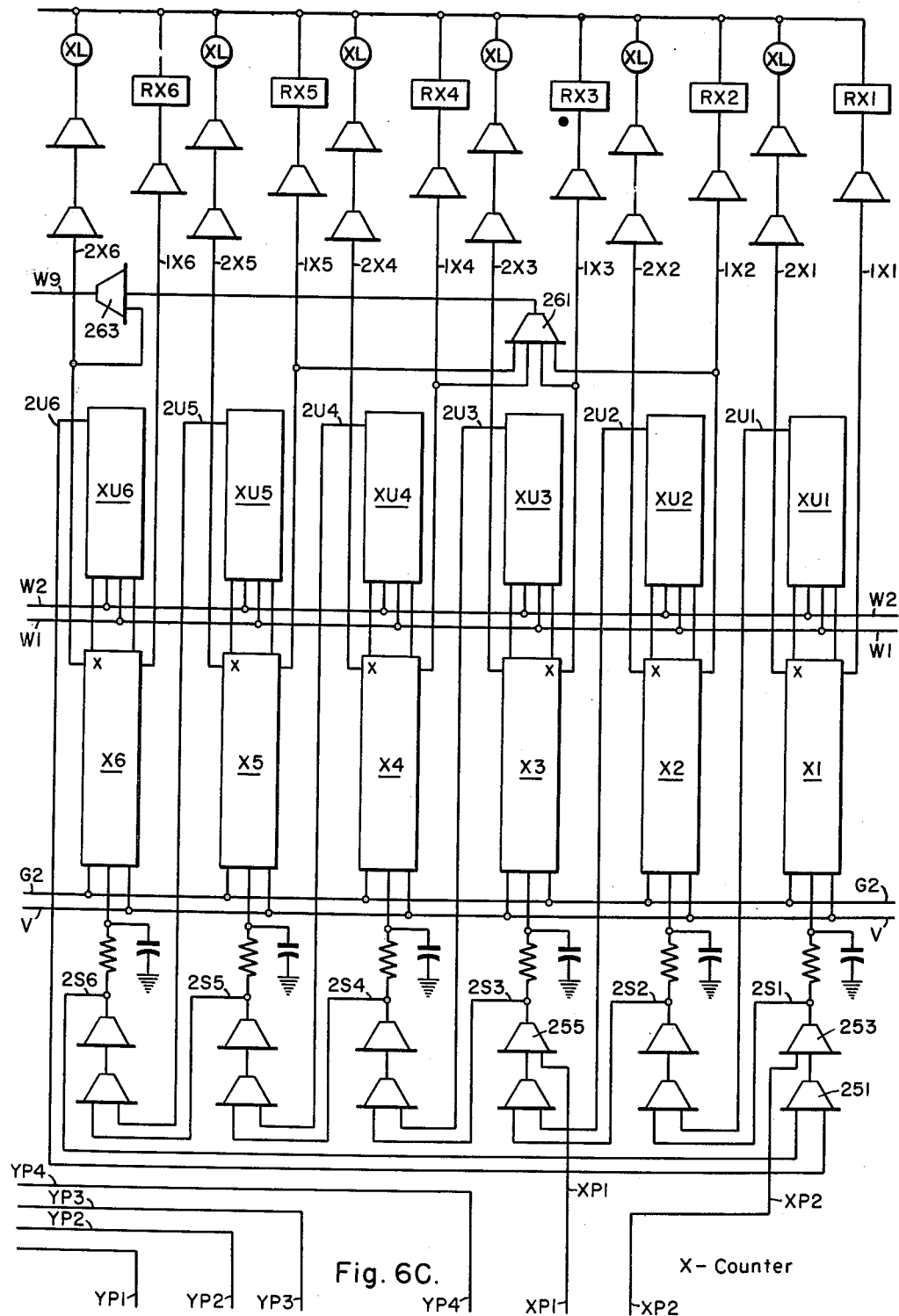
Figure 6D:
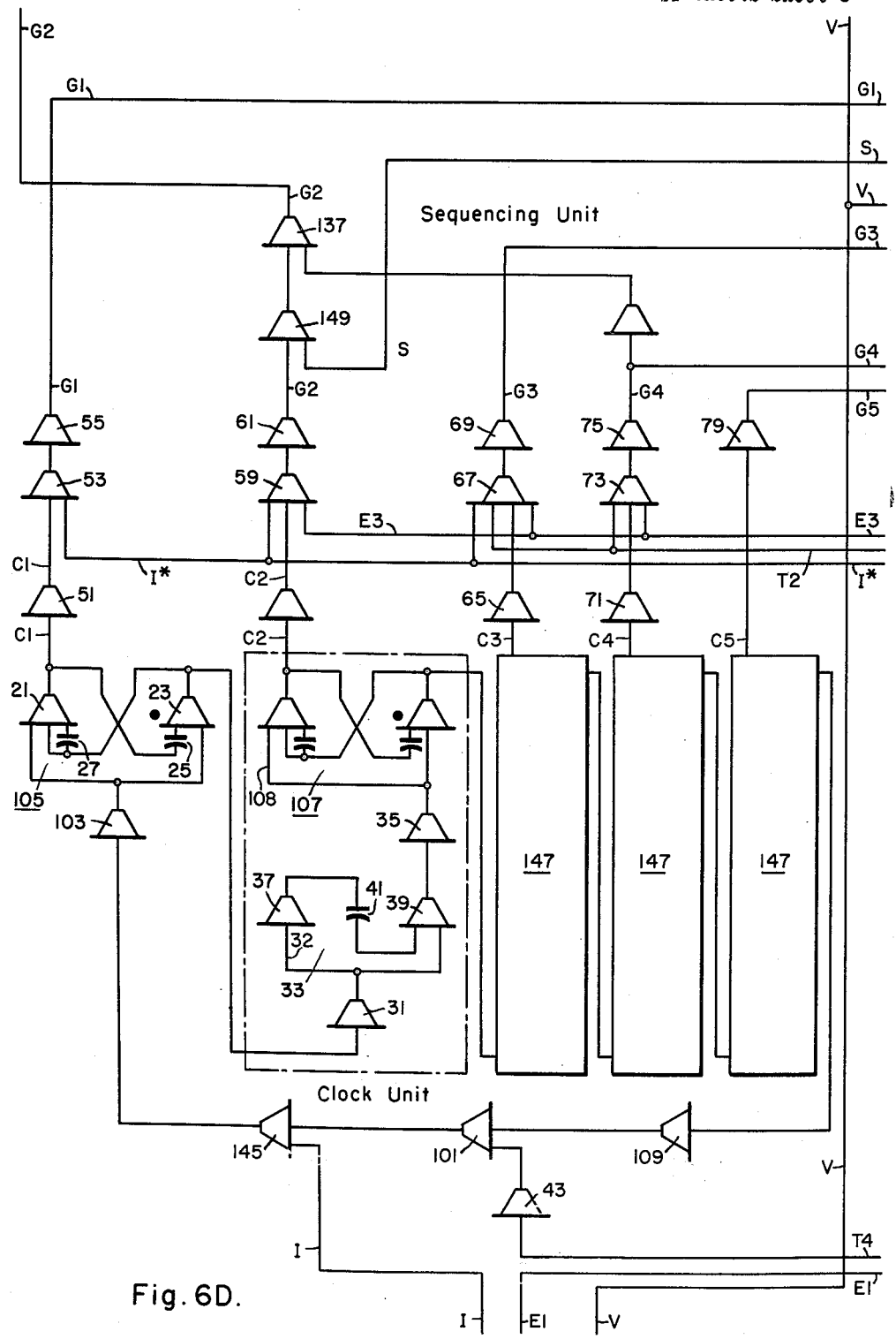
Figure 6E:
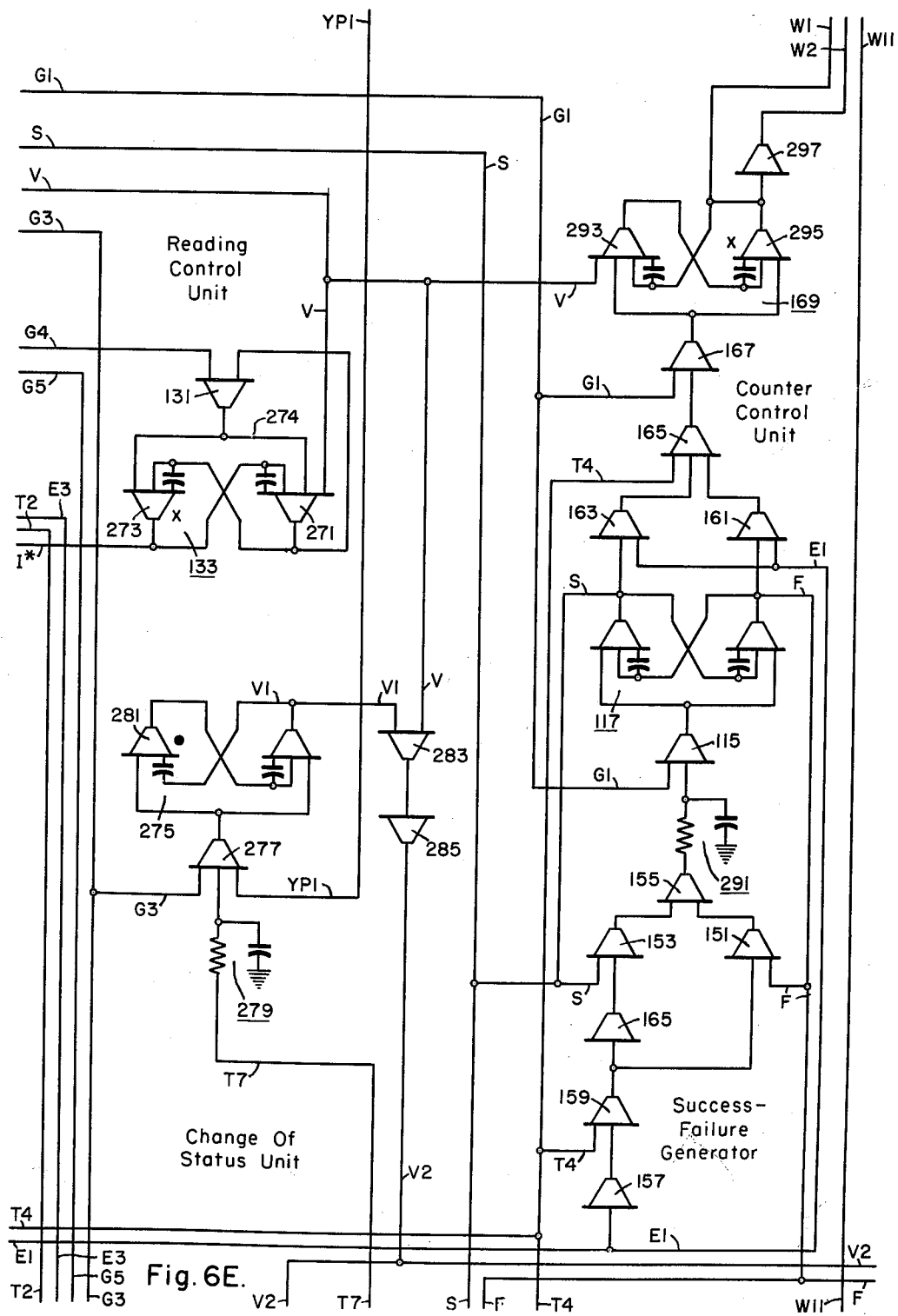
Figure 6F:
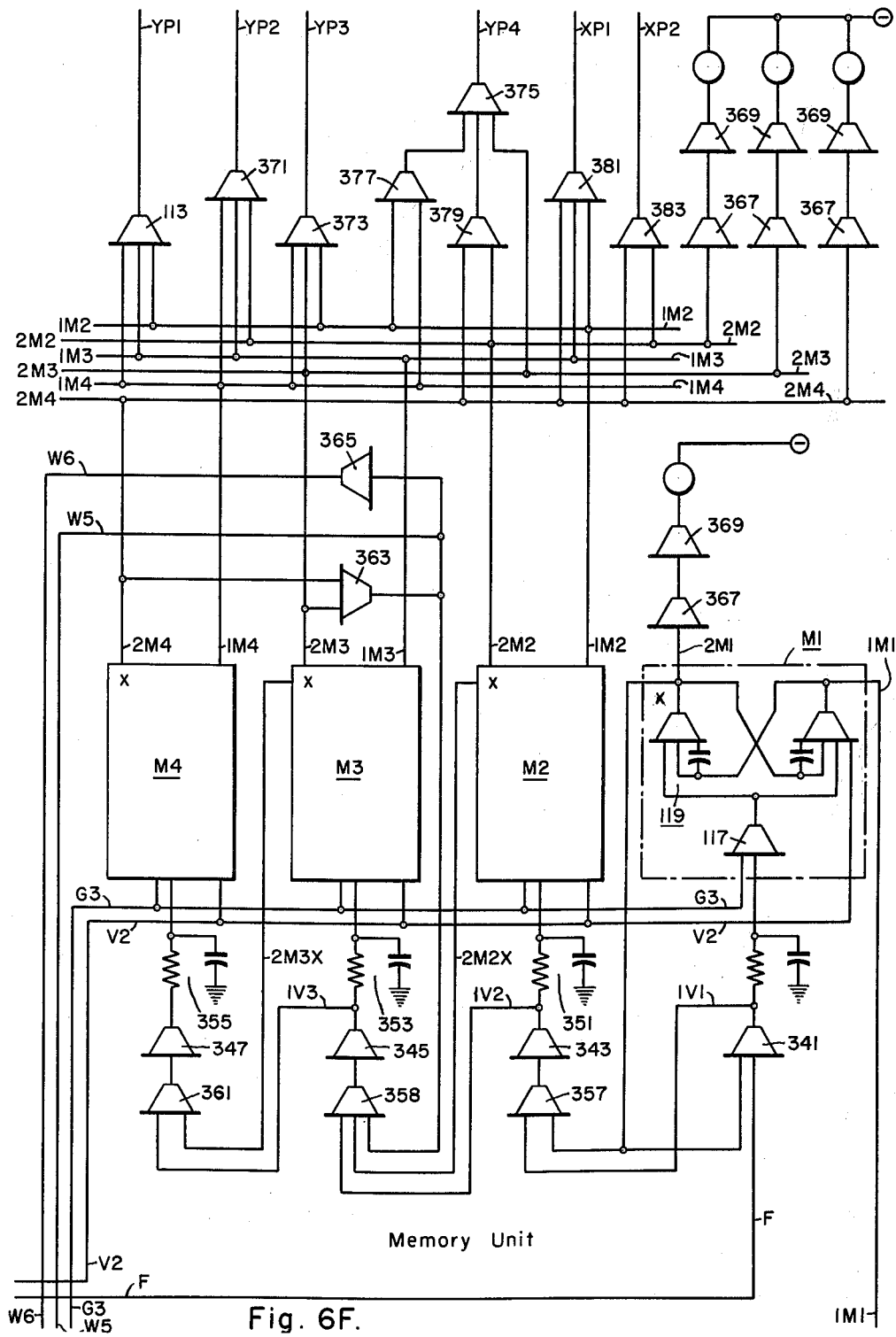
Figure 6G:
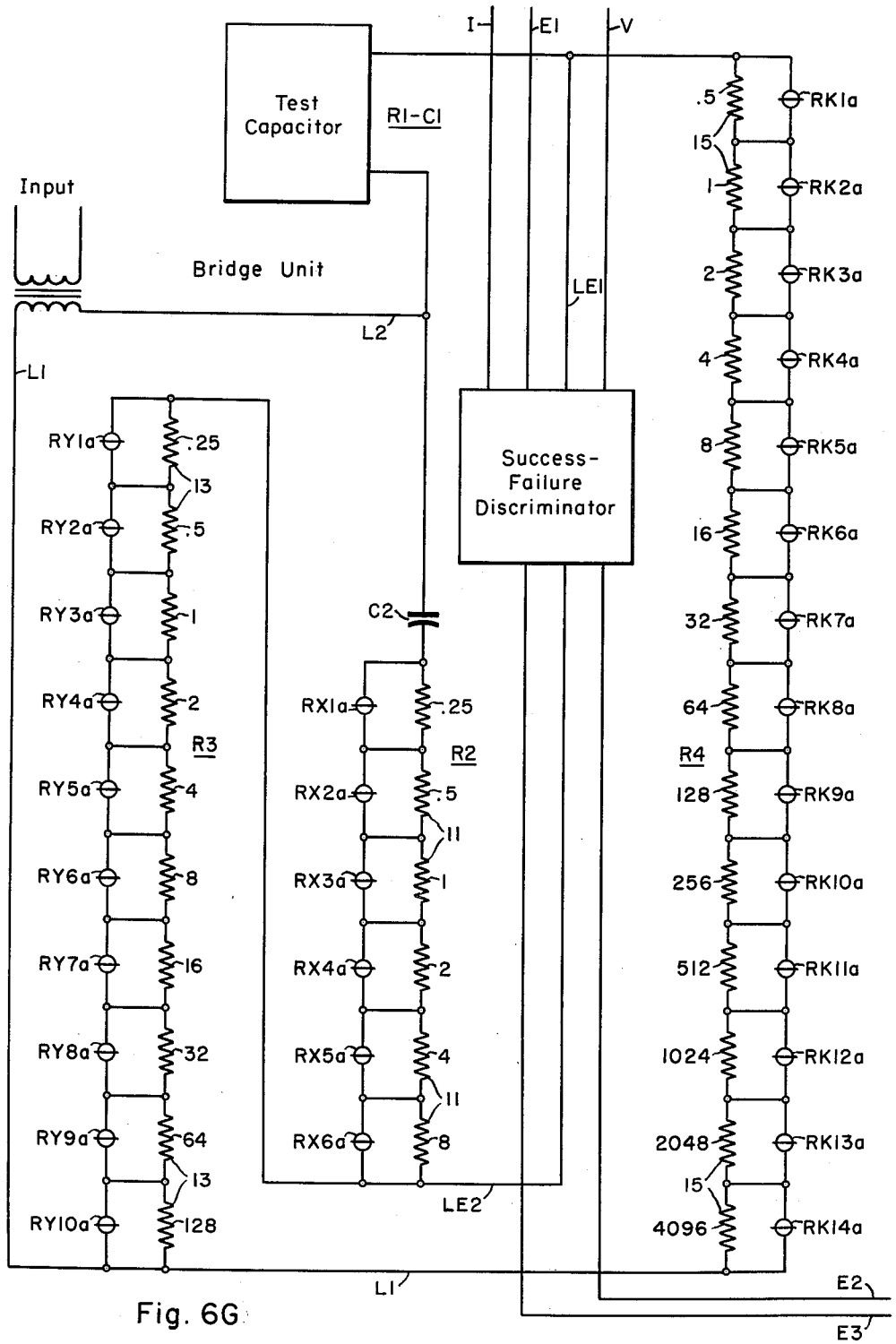
Figure 6H:
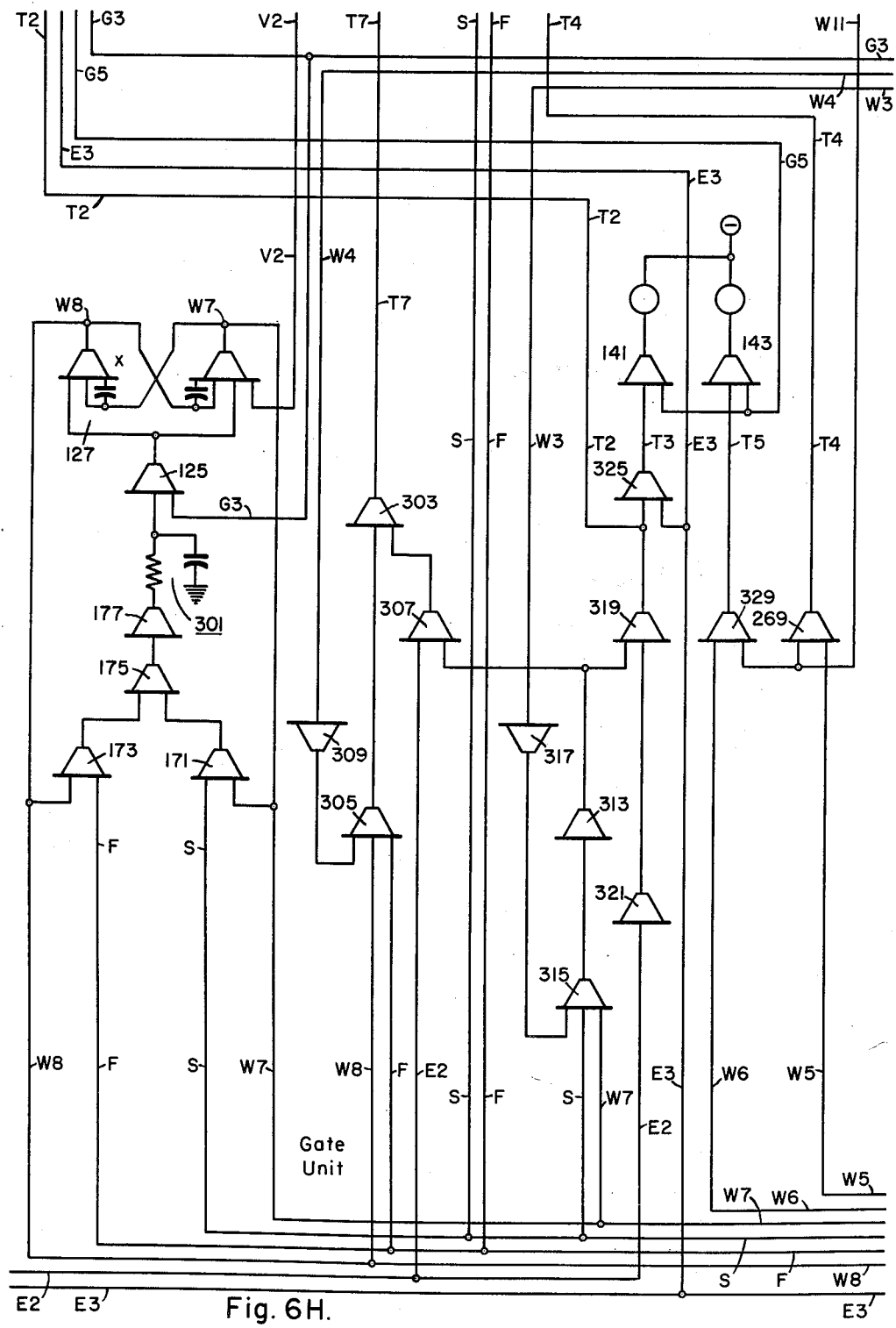
Figure 61:
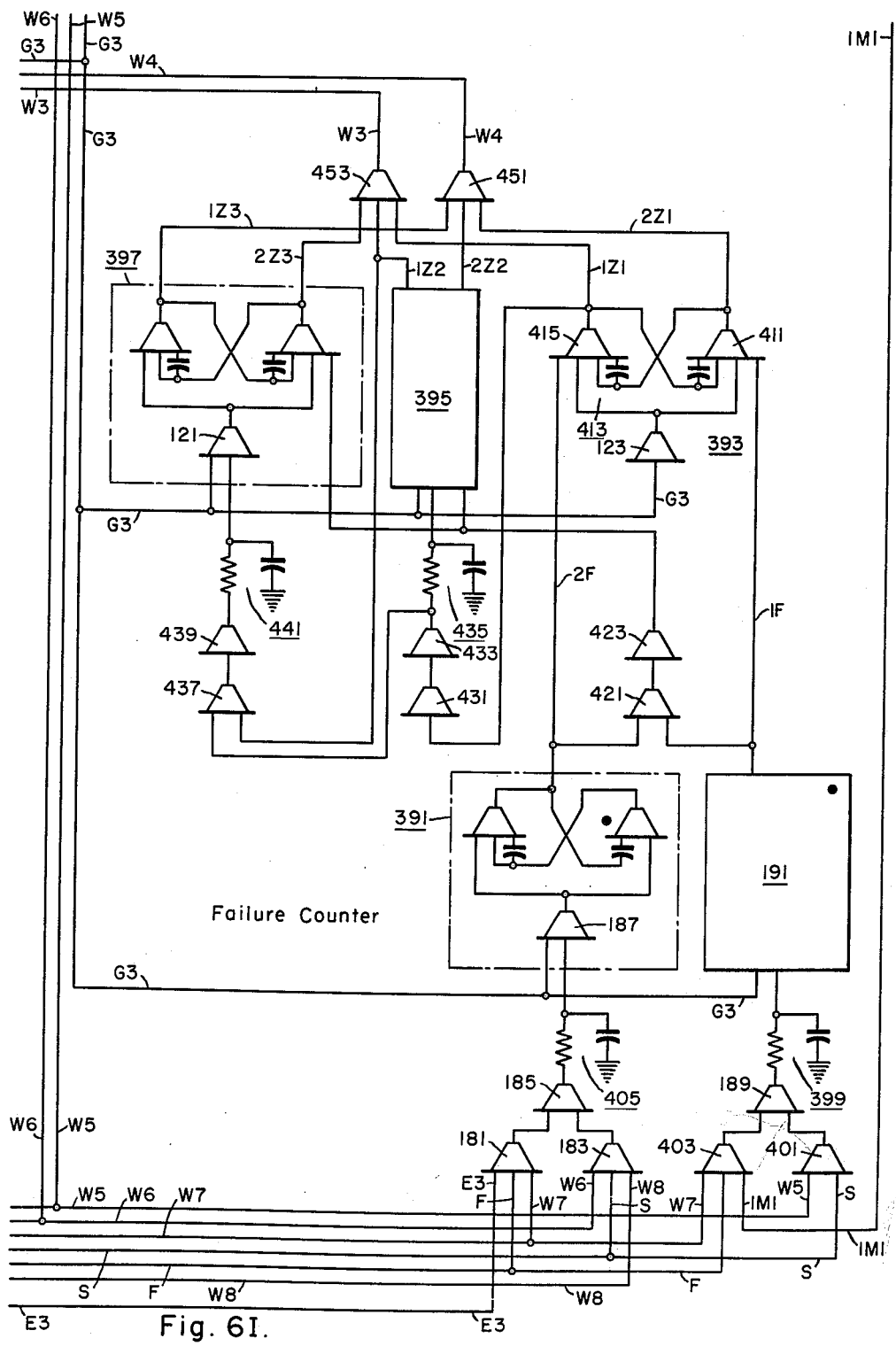

One of the important aspects of this invention in its specific aspects concerns itself with the form of the components R2, R3 and R4 in the arms and is shown in FIG. 6G. In accordance with this aspect of this invention, each of these resistors is made up of a series of resistance elements 11, 13, and 15 respectively of different resistance as labelled. Each element 11 is shunted by a back contact RX1a through RX6a of a relay RX1 through RX6. The elements 13 are similarly each shunted by back contacts RY1a through RY10a of relays RY1 through RY10. The elements 15 are shunted by contacts RK1a through RK14a of relays RK1 through RK14 (coils not shown). The RX and RY relays are selectively operated in balancing the bridge; the RK relays are selectively operated preferably by a punch-card system set to correspond to capacitor C1 being tested.

The invention may in accordance with broader aspects be applied to testing inductive reactors. Any of the resistors R2, R3, R4 may in accordance with the broader aspects of this invention be impedances of other types. For example, the arm C2—R2 may be made up of capacitors or the arm R4 of inductors or capacitors.

Block D, the control operates as follows: After R4 (FIG. 2) is set in accordance with the supposed size of the capacitor C1, the actual balancing of the bridge takes place. During the balancing process the essential picture is as in FIG. 3.

At the beginning of the balancing process, R2 and R3 have some particular values which produce a reading on the galvanometer. The control acts on this reading in the manner described below. It is important that the arms R2 and R3 are varied separately and not together. An internal diagram of part of the control for varying R3 is shown in FIG. 4.

In FIG. 4, box 1 represents a two-state device, the states corresponding to "+," i.e. an increase in R3 and to "—," a decrease in R3. Box 3 represents a device having two or more states which correspond to the magnitudes of the changes to be made in R3. Initially box 1 is in the + state, while box 3 is in state 1, corresponding to a change of $\Delta_1$ ohms in R3, subsequent stepsizes of $\Delta_2, \Delta_3, \ldots, \Delta_n$ are represented by states 2, 3, ..., n of box 3. Box 2 is a three-state device initially in state 0, and later varying among states 0, 1, 2. The R3 changer changes R3 in accordance with the states of boxes 1 and 3. Boxes corresponding to 1, 2, 3 are also provided to perform the same functions for R2.

The Success-Failure Discriminator which corresponds to the galvanometer of FIGS. 1 and 3 is a two-state device. If the latest change in R3 reduces the magnitude of $u$, the galvanometer reading, this change is called a "success"; otherwise it is called a "failure." The Success-Failure Discriminator distinguishes between the two cases.

Each time a failure occurs, the state of box 1 is changed; otherwise it remains the same. When box 2 is in state 0, a success or a failure puts it in state 1. When a failure occurs with box 2 in state 1, and box 3 is not in state n, the state of box 2 returns to 0; when a failure occurs with box 2 in state 1 and box 3 in state n, box 2 goes into state 2. Whenever the state of box 2 changes from 1 to 0, the state of box 3 increases by one, if possible.

When the R3 status box goes into state 2, the R2 circuit takes over and continues until its status box goes into state 2. After this first phase, the second phase begins with the R3 circuit taking over again with its status box in state 0 and its stepsize box still in state n, continuing until the status box is in state 2. A like sequence follows on the R2 circuit, and these alternate until stopped as follows.

During the second phase a counter (which counts only to 1) records, for each sequence of R3 changes or of R2 changes, whether a success occurs. (That is, it counts successes up to 1.) When four consecutive sequences (recorded on a second counter) occur without a success, the operation stops. If, at this time, $$u < k_1$$

where $k_1$ is a number dependent on the accuracy desired, the test is over. If $u \geq k_1$, some mistake has been made (due to noise, for example), and the testing begins again, with all boxes in their initial states, but starting from the existing resistance settings.

In addition to the above diagrams, the following side circuits are necessary:

(a) A circuit which spots an order to change R2 or R3 to a value outside its allowable range. When this happens, the R2 changer (or R3 changer) is bypassed and a "failure" signal sent to the Success-Failure Discriminator.

(b) A box which examines $u$. Whenever $u$ becomes less than a preassigned number $k_2$, depending on the accuracy desired, the whole test stops.

Each "success" produces a smaller value of $u$. If a sufficiently small stepsize is in use, a success can always be obtained by changing R2 or R3, unless $u$ is already 0. If the unknown capacitance is known to lie in a certain range, one can compute how many steps will be necessary (at most) to achieve balance, depending on the stepsizes used. One can then determine the stepsizes so as to reduce the maximum number of steps to a minimum. The time required can then be computed from the speed with which changes can be made. This speed depends on the type of components used and upon the time required for the controlled process (circuit) to show the full effect of each change. Knowing the response time of the process, one can choose components of appropriate speed. In approximate order of their speed capabilities, the available components are pneumatics, hydraulics, relays, magnetics, semiconductors and vacuum tubes.

In a specific embodiment of this invention which has been found to operate satisfactorily transistors are employed, although the speed required would have permitted relays or magnetics to be used. Considerations of reliability and engineering convenience prompted the choice of the NOR, a transistorized logic module. The logic of the control is shown in FIG. 5.

Variation of the bridge elements is accomplished by switching through the contacts of the RX, RY, RK relays (in the apparatus actually used C. P. Clare Co., type HGP 1012). These relays have the very low contact resistance necessary to preserve the accuracy of the variable bridge elements.

ADVANTAGES

The primary advantage of the optimizing control disclosed herein is that questions of stability which must be solved to apply servo techniques are entirely avoided. (Kneller, V. Y.—"Concerning One Type of A.C. Bridge With Automatic Balancing by Two Parameters," Automation and Telemechanics (Russian) February 1958, pp. 162–173.) In addition the behavior of the process (the bridge network) need not be known in detail; this is an important advantage since the capacity of the capacitor C1 to be balanced is unknown at the outset. Since the only moving elements are the very reliable RX, RY, RK relays, the overall system will possess a degree of reliability much greater than that attainable with servo-driven variable circuit elements.

DESCRIPTION

The apparatus shown in FIGS. 6A through 6I includes a Bridge Unit, a Clock Unit, a Sequencing Unit, a Y Counter, an X Counter, an Initial Reading Control Unit, a Change of Status Unit, a Counter Control Unit, a Success-Failure Generator, a Gate Unit, a Memory Unit, and a Failure Counter. This apparatus includes a number of NOR's which are connected to perform the various functions of the apparatus. Each of these NOR's has an output or no output depending upon the signal impressed on any of its input terminals. An output will be designated herein by the number 1 and no output will be designated by 0. The same designations will be applied to the outputs of the Flip-Flops. The apparatus shown in FIGS. 6A through 6I also includes a number of terminals or conductors designated by letters such as E1, E2, E3, C1 and others along which the various signals flow. The signals which flow along the terminals will at times in this specification, be designated by the same letter as the conductors along which they flow. Thus, a signal which flows along a conductor E1 will be at times designated signal E1. The apparatus includes a number of monostable and a number of bistable Flip-Flops. The monostable Flip-Flops are shown with a dot adjacent the terminal, which has a 1 output when the input is zero. The bistable Flip-Flops which are reset to a predetermined state during the beginning of an operation are shown with a cross (X) adjacent the terminal which has a 1 output when so reset. A number of the Flip-Flops set themselves at random at the beginning of an operation. These bear no dot or cross.

The Bridge Unit includes a Success-Failure Discriminator and an alternating current bridge specifically a Wien Bridge the arms of which are made up of series of separate resistors 11, 13, and 15 as described above and which includes the capacitor to be measured and the capacitor C2. The Success-Failure Discriminator is described in detail in the Wendt application. It operates to determine whether each move of the bridge carried out with the apparatus is a success or a failure, and it also has the function of remembering the reading observed during the last move of the series which was a success; this move may be called the last best move. The output conductors LE1 and LE2 of the bridge are connected to the input of the Discriminator through an amplifier (not shown).

The Discriminator starts its operation when a signal S* is impressed thereon. The signal S* may be derived from a reset line V connected to the Discriminator which may be energized by actuating a push button. The signal V resets the Discriminator for each new optimizing operation and supplies the starting signal S*. As is explained in the Wendt application during an operation a sync pulse $s$ is produced. This sync pulse $s$ triggers a conversion operation which converts the voltage at any time between LE1 and LE2 into a pulse delayed with respect to the $s$ pulse by a time interval proportional to the voltage between LE1 and LE2. This pulse is called an error pulse and is designated by $e$ with a numeral indicating the move of a group for which the error is produced. Thus $e1$ is the first error signal of a group, $e2$ the second, $e3$ the third, etc. The time interval between $s$ and $e$ measures the output of the bridge. The sync pulse produces its triggering operation once during each trial and the Success-Failure Discriminator compares the intervals between $s$ and $e$ and the last best $s$ and $e$ and retains an improved interval suppressing either the earlier best interval in the event of a success or the latest interval in the event of a failure. The sync pulse $s$ may be produced in any convenient manner.

The Discriminator has output terminals I and E1, E2, and E3.

Along the output conductor I a signal is transmitted which actuates the Clock Unit during each move or trial. The signal I is a 1 pulse generated by sync pulse $s$ during each new move. The output conductor E1 transmits a signal during each trial which is successful. No signal is transmitted from the Success-Failure Discriminator if a trial is a failure. The Success-Failure Discriminator delivers a signal E2 when the output potential between LE1 and LE2 of the bridge is within acceptable limits, that is, so low that the measurement of the dissipation factor and capacity of the capacitor will be correct within the permitted limits of error. The Discriminator has an output E3 if the output of the bridge between LE1 and LE2 is substantially zero.

The Clock Unit delivers signals in timed succession along conductors C1, C2, C3, C4 and C5 when actuated by a signal I. For each signal I only one succession of signals C1 through C5 are delivered. The signal C1 is delivered by a monostable Flip-Flop 105 which includes a pair of NOR's 21 and 23, C1 being connected to the output of 21. Inputs of NOR's 21 and 23 are interconnected, the common connection being the input to the Flip-Flop. The output of NOR 21 is connected to another input of NOR 23 through a capacitor 25. The output of NOR 23 is connected to another input of NOR 21 through a capacitor 27 and directly to a third input. Capacitor 25 is substantially smaller than capacitor 27.

With 0 signal in the input to 105, the signal on C1 is 0 and that at the other terminal 1. The impressing of a signal 1 on the input to 105 sets this Flip-Flop in a state such that the output at C1 is 1 and the output of 23 is 0. Because of the connection across capacitor 27, the Flip-Flop 105 always reverts to C1 0 for input 0. Capacitor 27 and the input of NOR 23 across which it is connected time the interval during which C1 is 1 after a 1 signal is impressed on the input to 105 and then removed. The conductor I is connected to the input of Flip-Flop 105 through NOR's 145 and 103 and supplies the actuating signal for this Flip-Flop.

Conductor C2 is supplied from a Flip-Flop 107 which is similar to the Flip-Flop 105 so that the terminal C2 is 0 with 0 on the input 108 of the Flip-Flop 107 and the other terminal is 1. The input 108 of Flip-Flop 107 is supplied from the output of NOR 23 of Flip-Flop 105 through a NOR 31, a delay element 33 and a second NOR 35. The delay element 33 includes a pair of NOR's 37 and 39. The output of NOR 37 is connected to the input of NOR 39 through a capacitor 41. With 1 signal on the output of NOR 23 of Flip-Flop 105, there is a 0 signal on the input 32 of the delay 33, a 1 signal on its output and a 0 signal on the input 108 of Flip-Flop 107. This condition is reversed if a 1 signal appears at C1 and a 0 signal at the output of NOR 23. Thus, once the signal appears on C1 it is followed by a signal on C2. C3, C4 and C5 are supplied through a delay and a Flip-Flop similar to delay 33 and Flip-Flop 107 and are successively connected to the outputs of the preceding Flip-Flops in the same manner as Flip-Flop 107 is connected to Flip-Flop 105. Thus, the signals at C3, C4, and C5 are normally 0 but become successively 1 following the instant when signal C1 becomes 1. The 1 signal on C1 is instantaneous Flip-Flop 105 being reset as soon as I disappears. After 105 is reset the element 33 prevents 107 from resetting during a predetermined time interval. The sequence of the signals produced by I is shown in FIG. 8. The output terminal of the last unit 147 of the chain which is not connected to C5, is connected to the input of a NOR 109 which is connected to one of the inputs of a NOR 101. The other input of this NOR is supplied from the output of a NOR 43, the input of which is supplied from T4. T4 is normally 0 so that this input to 101 is 1 and 101 is normally blocked. The output of 101 is 0 and is supplied to one of the inputs of 145, the other being supplied through I. Thus, with a 0 signal on I and a 0 signal on T4, the output of 145 is 1, the output of 103 is 0, and the conductors C1, C2, C3, C4 and C5 have zero signals. It is seen that the T4 0 signal normally prevents the transmission of a signal through NOR 101. This prevents the clock from producing more than one cycle for each signal transmitted along I. T4 has a 1 signal after there has been a predetermined number of successes, for example, four successful moves. In this case, the clock is permitted to produce an additional set of signals C1 through C5 when signal T4 becomes 1. There is thus an automatic failure signal produced after a number of successes. This makes feasible the rapid setting of the bridge since after a predetermined number of successes the bridge must be near its balanced condition and it is desirable that the incremental changes in the resistive and phase arms R3 and R2—C2 respectively should be reduced.

The Sequencing Unit produces signals along conductors G1, G2, G3, G4 and G5 to select the proper changes to be made automatically in the apparatus and assures that they are made in the proper sequence. Thus, the conductors G1 through G5 of the Sequencing Unit determine which of the relays RY1 through RY10 and RX1 through RX6 are to be actuated and in what order this actuation is to take place. The signals on conductors G1 through G5 also determine what sequencing is to take place in the other parts of the apparatus for example, in the Memory Unit and in what order these changes are to be made.

Signal G1 is controlled by signal C1. For this purpose, conductor C1 is connected to conductor G1 through NOR's 51, 53 and 55. NOR 53 has another input to which conductor I* is connected. Thus, when there is a signal on I* a signal cannot pass through 53 for changing G1. Since C1 is normally 0, G1 is normally 1. A signal on G1 is manifested by a change from 1 to 0 and back to 1. The signal is instantaneous following a corresponding signal on C1.

Conductor C2 is connected to conductor G2 through NOR's 57, 59, 61, 149 and 137. NOR 59 has in addition to the input from C2, an input supplied from I* and another input supplied from E3. NOR 149 has an input in addition to the one connected to NOR 61. The S conductor is connected to this input. A 1 signal appears on S when a move is successful. Thus during a success 149 is blocked and no signal is transmitted on G2 at the time of the C2 signal.

NOR 137 also has an input in addition to the input from 149. This input is connected to G4 and causes a signal to be transmitted through G2 when there is a signal on G4. Thus, only the signal G4 appears on G2 in the event of a success, but in the event of a failure G2 and G4 both appear on G2 in timed succession. In the event of a failure G2 operates to return the X or Y Counter in use to its prior setting and G4 to cause this Counter to produce a move of the polarity opposite to that which produced the failure.

Conductor C3 is connected to conductor G3 through NOR's 65, 67, and 69. NOR 67 is, in addition, connected to receive inputs from conductors I*, E3 and T2. In the absence of a signal on I*, E3 or T2, NOR 67 permits the signal C3 to pass to G3. E3 operates to stop operation because the bridge is balanced. Conductor C4 is connected to G4 through NOR's 71, 73 and 75.

NOR 73 has inputs supplied from T2 and E3 in addition to the input from 71. G4 is connected to G2 through NOR 135. C5 is connected to G5 through NOR 79.

The Y Counter includes a plurality of Flip-Flop units Y1 through Y10, and a plurality of up and down selecting elements YU1 through YU9. The Flip-Flop units produce the counting operation of the Y Counter and the elements YU1 through YU9 determine whether the counting is in the direction to increase the resistance R3 or R2 or in a direction to decrease these resistances.

Each Flip-Flop unit Y1 through Y9 includes a bistable Flip-Flop 91 and a cooperative NOR 93. Each of the Flip-Flops 91 is controlled from conductor G2 and may be reset by a signal from conductor V. Thus Flip-Flops 91 are subject to control by G4 in the event of a success and both by G2 and G4 in the event of a failure.

The reset conductor V is connected to one of the inputs of the NOR 95 of Flip-Flop 91, and resets each Flip-Flop 91 as shown. For each of the units Y1 through Y10, a 1 signal on V causes the output of 95 to become 0 flopping the output of the other NOR 97 to 1, and thus setting Flip-Flop 91 in the position in which the NOR 95 has an output 0 along conductors 1Y1 through 1Y10 and the NOR 97 has an output 1 along conductors 2Y1 through 2Y10. The coil of an associated relay RY1 through RY10 is connected to the output 1Y1 through 1Y10 of each Flip-Flop 91 through a NOR 99. The remaining terminal of the relay is connected to the negative pole of the supply. Thus, when the Flip-Flop 91, for any of the elements Y1 through Y10, is reset, the output of 99 is 1 and the associated relay RY1 through RY10 is deenergized. Under such circumstances, the associated back contact RY1A through RY10A of the relay is closed. The output 2Y1 through 2Y10 of each Flip-Flop 91 is connected to a signal light through two NOR's 201 and 203. When the output of 97 is reset to 1 by signal V, the output of 203 is 1 and the lamp is deenergized since its other terminal is connected to the negative pole of the supply.

The units Y1 through Y10 are controlled from conductor G2 and from reset conductor V. Conductor G2 is connected to an input of NOR 93 of each unit. Normally this conductor has a 1 signal and thus the output of NOR 93 is normally 0. When G2 receives an instantaneous 0 signal, the output of 93 becomes 1 and Flip-Flop 91 flops. Only one flop occurs (at time C4) in the case of a success and two successive flops occur (at times C2 and C4) in case of a failure. V is connected to an input of NOR 95 of each Flip-Flop 91. When V receives a reset 1 signal, it resets all Y units to the state shown.

Each unit YU1 through YU9 is controlled from conductors W1 and W2 and from the associated Flip-Flop 91 so that they determine in accordance with the setting of W1 and W2 and the associated Flip-Flop 91, whether the resistance of arm R3 is to be increased or decreased.

Each element YU1 through YU9 includes a pair of NOR's 205 and 207 which together control a third NOR 209. The output of each third NOR 209 is connected to a conductor 1U1 through 1U9. Each of the NOR's 205 and 207 has two inputs. One input of 205 is connected to W2 and the other input to conductor 2Y1. One input of 207 is connected to W1 and the other to 1Y1.

The first counting stage Y1—YU1 is controlled from conductor YP4 which in turn, is controlled from the Memory Unit. Conductor YP4 is connected to the input of NOR 211 which is connected to an input of NOR 93 through a signal holding network 212 consisting of a resistor 213 and a capacitor 215 which hold the effect of a signal on the output of 211 for a sufficiently long time to permit it to cause 93 to perform its function.

The output of NOR 211 is also connected to conductor 1S1. Conductors 1S1 and 1U1 are connected to inputs of a NOR 217, the output of which is connected to the input of a NOR 219. The output of NOR 219 is connected to conductor 1S2 and through a holding network 220 including resistor 221 and capacitor 223 controls NOR 93 of Flip-Flop unit Y2. 1S2 and 1U2 are similarly connected through NOR's 225 and 227 to the input NOR 93 of Y3. The additional input of 227 is connected to conductor YP3, which is controlled by the Memory Unit. 1S3 and 1U3 are similarly connected to Y4; 1S4 and 1U4 are similarly connected to Y5. In this case, the intermediate NOR 229 is, in addition, controlled by conductor YP2 which is connected to one of its inputs and is controlled from the Memory Unit. Y6 is similarly controlled from the Memory Unit. Y6 is similarly controlled from 1S5 and 1U5 and Y7 is similarly controlled from 1S6 and 1U6. The intermediate NOR 231 is in this case also controlled from YP1, in turn, controlled by the Memory Unit. 1S7 and 1U7 similarly control Y8, 1S8, 1U8, Y9 and 1S9 and 1U9, Y10.

Conductors 2Y9 and 2Y10 are connected to the input of a NOR 241. Conductors 1Y8, 1Y9 and 1Y10 are connected to an input of a NOR 243. The output of NOR's 241 and 243 are connected to a NOR 245. Output of NOR 245 is connected through a NOR 247 to the conductor W10.

The X Counter is similar to the Y Counter including Flip-Flop units X1 through X6 and up and down selecting units XU1 through XU6. The interconnection between each X element and XU element and the succeeding X element and XU element is similar to the interconnection in the case of the Y Counter. There is one important difference and that is that the input NOR 93 of the Flip-Flop unit X1 is controlled from two NOR's in cascade 251 and 253 instead of one NOR as for Y. The other elements X2 through X6 are likewise controlled from two NOR's 254 and 255. Each NOR 251 and 254 has two inputs, one connected to the corresponding 2S conductor and the other to the 2U conductor of the prior stage. 2S6 and 2U6 are connected to the inputs of NOR 251 of the X1 stage. The output of each NOR 251 and 254 is connected to one input of the associated NOR 253 and 255. An input of NOR 253 connected to X1 is connected to XP2 which in turn is controlled from the Memory Unit. An additional conductor XP1 controlled from the Memory Unit is connected to an input of NOR 254 connected to X3. Output conductors 1X2, 1X3, 1X4 and 1X5 of Flip-Flop units X2, X3, X4 and X5 are connected to inputs of a NOR 261. The output of the NOR 261 and 2X6 are connected to the input of a NOR 263, the output of which is connected to W9. W9 and W10 are connected to the input of NOR 265, the output of which controls conductor W11 which is connected to T4 through NOR 269. When there is no output on W10, W11 has an output and there is then no output on T4.

The Reading Control Unit includes a Flip-Flop 133 having a NOR 131 connected to its input 274. One input of NOR 131 is connected to G4. The other input is connected as a feed-back to the output of one of the NOR's 271 of Flip-Flop 133. NOR 271 has a reset input which is connected to the reset conductor V. With a signal on the reset conductor, Flip-Flop 133 is set with 0 on 271 and 1 on the other NOR 273 as indicated. Once Flip-Flop 133 flops responsive to zeros at the input of 131, an output of 1 on 271 is maintained by the feedback from the output of 271 to the input of 131. With the Flip-Flop 133 in reset state (reset by V) there is a signal on I*. Thus, an optimizing operation of the apparatus may be started by enabling or transmitting the reset signal V.

The Change of Status Unit includes a Flip-Flop 275 controlled from a NOR 277. This NOR has three inputs, one is connected to YP1, another to G3, and a third is controlled from conductor T7 through a signal holding network 279. Flip-Flop 275 is monostable and sets itself with a 1 signal on the output of its NOR 281 when there is 0 at the output of NOR 277. A signal V1 is derived from Flip-Flop 275 when it flops to the opposite state. V1 and V are connected to the inputs of a NOR 283, the output of which is connected to a NOR 285. A signal V2 for reset purposes is derived from the output of 285.

The Success-Failure Generator includes a Flip-Flop 117 controlled from a NOR 115. One of the inputs to NOR 115 is supplied from G1. The other input is supplied from NOR 155 through a resistor-capacitor signal-holding network 291 for holding the output signal on 155 for an adequate time to enable the Flip-Flop 117 to respond. The Flip-Flop 117 has an output conductor S on which a 1 signal appears when the move is successful and another output conductor F on which a 1 signal appears for a failure move.

NOR 155 is controlled by NOR's 151 and 153. One of the input terminals of NOR 151 is connected to conductor F in feedback relationship. One of the input terminals of NOR 153 is connected to conductor S in feedback relationship. The other input terminal of 151 is supplied from conductor E1 through NOR's 157 and 159. E1 is connected to the input of 157 and the output of 157 is connected to one of the inputs of 159. In addition, another input of 159 is connected to T4. The output of 159 is connected to the other input of 151. NOR 153 is controlled from NOR 165 to which the output of 159 is also connected.

Flip-Flop 117 is bistable and initially sets itself at random in either S or F position. But once the moves start 117 sets itself for a 1 on S for each success and a 1 on F for each failure. For example, assume that initially there is a 1 signal on F. In this case the output of 151 is 0 and with E1 and T4 0 as they would be initially the output of 153 is 0 and the output of 155 is 1. The output of 115 is 0. Since G1 is 1 no signal can pass through 115. Now if an E1 signal appears, the output of 153 becomes 1, the output of 155 becomes 0, and the output of 115 becomes 1 when G1 appears. (The G1 pulse is 0 instantaneously.) Under such circumstances, Flip-Flop 117 flops from position F to position S. If no signal appears on E1, the output on 155 remains 1, the output of 115 is 0, and G1 has no effect leaving Flip-Flop 117 in position F.

The Counter Control Unit includes a Flip-Flop 169 which is controlled from a NOR 167. One of the inputs of NOR 167 is connected to conductor G1. Thus, Flip-Flop 169 may under the proper circumstances be controlled by signal G1. One of the NOR's 293 of Flip-Flop 169 has an input connected to reset conductor V. During reset then, the Flip-Flop is set with 1 on the opposite terminal 295 as indicated. The output terminal of the other NOR 295 of Flip-Flop 169 is connected to conductor W2 through NOR 297 and directly to conductor W1. It is seen that immediately following reset, W1 has a 1 signal and W2 has a 0 signal. The other input terminal of NOR 167 is controlled by NOR 165 which, in turn, is controlled by NOR's 161 and 163. One of the input terminals of NOR 161 is connected to conductor F. The other is connected to conductor E1. One of the input terminals of NOR 163 is connected to conductor S, the other to conductor E1. The outputs of 161 and 163 and conductor T4 are connected to inputs of 165. The status of Success-Failure Flip-Flop 117 and the presence of absence of a signal E1 then determines the condition of NOR 165.

T4 is 0, except during the automatic failure after a number of successes.

Assume that initially Flip-Flop 117 is set at F. The output of 161 is then 0, the output of 163 1 and the output of 165 is 0. But G1 blocks 167. Now if an E1 signal is produced, the output of 163 becomes 0, that of 165 1 and when G1 appears it has no effect on 167, the output of 167, remains zero. But if a failure occurs and there is no signal at E1, the output of 165 becomes 0 and the G1 pulse at time C1 flops Flip-Flop 169 so that W1 becomes 0 and W2 1. Thus, a change in polarity, which is produced by the disappearance of a signal on W1 and the appearance of a signal on W2, takes place only after a failure.

The Gate Unit includes Flip-Flop 127 which supplies conductors W8 and W7 at its terminals. Flip-Flop 127 is reset by V2 so that there is a 1 signal on W8 and a 0 signal on W7 just after reset. Flip-Flop 127 is controlled from NOR 125, which in turn, is controlled from NOR 177 through a network 301, which holds any signal appearing on 177. NOR 125 is also controlled from conductor G3. The input of NOR 177 is connected to the output of NOR 175, which is controlled by NOR's 171 and 173. NOR 171 has a feedback input connection to W7 and, in addition, is controlled from conductor S. NOR 173 has a feedback input connection from W8 and, in addition, is controlled from conductor F.

W7 and W8 control conductors T7, T2 and T3. T7 is connected to the output of a NOR 303, the input of which is controlled by NOR's 305 and 307. NOR 305 has three inputs, one connected to F, the other connected to W8, and a third connected to W4 through NOR 309. 307 has two inputs one connected to E2 and the other controlled from W7 and S through NOR's 313 and 315. NOR 315 has three inputs, one connected to W7, another to S, and a third to W3 through NOR 317. T2 is derived from the output of a NOR 319 which is controlled from W7 and S through 313 and 315. One of the inputs of 319 is connected to 313, the other input is connected through a NOR 321 to conductor E2. T3 is connected to the output of NOR 325, the input of which is connected to the output of 319 and to the conductor E3. T3 controls a lamp through NOR 141, which is also controlled by G5. Another lamp is controlled from W4 through NOR 329 and NOR 143. NOR 143 is also controlled by G5. NOR 329 is controlled by W4 and, in addition, by W11.

The Memory Unit has a plurality of Flip-Flop units M1, M2, M3 and M4. Each unit includes a Flip-Flop 119 and a NOR 117. Each Flip-Flop unit has output terminals 1M1, 2M1, 1M2, 2M2, 1M3, 2M3, and 1M4, 2M4 at the terminals of the associated Flip-Flops 119. During the reset portion of the operation, the Flip-Flops of M1 through M4 are reset by V2 so that 1M1, 1M2, 1M3, 1M4 have 0 output and 2M1, 2M2, 2M3 and 2M4 have an output of 1.

One of the inputs of the NOR 117 of each of the elements M1 through M4 is supplied from conductor G3. Flip-Flops 117 are then blocked until a 0 signal appears on G3 momentarily. This happens between signals C2 and C4 of the clock so that in the event of a failure the Memory Unit operates between the instant when G2 affects the Counters and the instant when G4 affects the Counters. Elements M1 through M4 are controlled by sequencing NOR's. For this purpose, the other terminal of each of the NOR's 117 is supplied from NOR's 341, 343, 345, and 347 through holding networks 349, 351, 353 and 355. NOR 341 has two inputs, one a feedback input from 2M1, and the other connected to F. NOR 341 has an output conductor 1V1, NOR 343, a conductor 1V2, NOR 345, a conductor 1V3. The input of NOR 343 is supplied through a NOR 357, the inputs of which are connected to conductors 2M1 and 1V1. NOR 345 is similarly supplied from NOR 358, two of the inputs of 345 being connected to 2M2 and 1V2, respectively. A third input is connected to W5, a feedback connection. NOR 347 is similarly supplied from a NOR 361 having inputs connected to 2M3 and 1V3.

Conductor W5 is connected to the output of NOR 363, the inputs of which are connected to 2M3 and 2M4. W5 then after reset has a 0 signal. W6 is connected to W5 through NOR 365 and accordingly, has a 1 signal after reset. 2M1 through 2M4 are connected to signal lamps through NOR's 367 and 369. When 2M1 through 2M4 have a 1 signal after rest, the lamps are deenergized.

YP1 is connected to the output of NOR 113, the inputs of which are connected to 1M4, 1M3, and 1M2. After reset by V2 then YP1 has a 1 signal. YP2 is supplied through NOR 371, which in turn has inputs 1M4, 1M3, and 2M2. YP2 then after reset has a 1 signal but will then have a 0 signal when 2M2 becomes 0 which would happen before 1M3 and 1M4 change. YP3 is controlled from NOR 373 which has inputs 1M4, 2M3, and 1M2. YP3 will then have a 0 signal when 2M3 becomes zero. 2M3 becomes 0 after 1M2 has become 1 but when 2M3 becomes 0, 1M2 returns to 0. YP4 is controlled from NOR 375 which is in turn, controlled from NOR's 377 and 379 and from 2M3. NOR 377 has inputs 1M2, 1M4; NOR 379 has inputs 2M4 and 2M2. NOR 375 then after reset has a 0 signal; the signal becomes 1 if 1M2 or 1M4 and 2M3 becomes 0 while either 2M4 or 2M2 remains unchanged. This happens for a certain sequence of results during an optimizing operation. XP1 is controlled from NOR 381, which has inputs 2M4, 1M3, and 1M2. XP1 then has a 0 signal after reset and until 2M4 becomes 0. XP2 is controlled by NOR 383 which has inputs 2M4 and 2M2 and has a 0 signal. YP1 through YP4 and XP1 and XP2 control the operation of the Y-Counters and the X-Counters, respectively. A 1 signal on any YP or XP controls the points in the X or Y-Counters at which a count is injected. The count may add or subtract. A 1 signal on YP2 permits the counters from Y5 up to count, a 1 signal on YP3 the counters from Y2 up and a 1 signal on Y4 all the Y Counters. XP1 and XP4 operate similarly.

The Failure Counter includes monostable Flip-Flop units 191 and 391 and bistable Flip-Flop units 393, 395, 397. The unit 191 is controlled from NOR 189 through a signal holding network 399. NOR 189 is controlled by NOR's 401 and 403. The inputs of NOR 401 are connected to conductors S and W5. The inputs of NOR 403 are connected to 1M1, F and W7, respectively. The input NOR 187 of unit 391 is controlled from NOR 185 through signal holding network 405. NOR 185 is controlled by NOR's 181 and 183. The inputs of NOR 181 are E3, F, and W7, the inputs of NOR 183 are W6, S, and W8. The inputs to elements 191 and 187 are also connected to G3. Thus in the absence of a signal on G3, the elements 191 and 391 remain in their stable state and there are 0 signals on the respective outputs 1F and 2F of units 191 and 391. Following reset W7 is 0, W6 is 1, WS is 1, 1M1 is 0, W5 is 0, E3 is 0. The outputs of 185 depend on the random settings of F and S; the output of 189 is 0.

Flip-Flop units 393, 395, 397 each includes a Flip-Flop 413 and a controlling NOR (123 for 393 and 121 for 397). One input of each of the controlling NOR's is connected to G3 so that in the absence of a G3 signal, the Flip-Flops 413 remain as set. During each move they may be changed at instant C3 and this depends on the settings of 1F and 2F.

1F is connected to the input of the NOR 411 of Flip-Flop 413 of unit 393; 2F is connected to an input of NOR 415 of Flip-Flop 413. Thus, unit 393 flops to a state depending on which of the elements 191 or 391 was last in the unstable state. Conductors 1F and 2F also supply the inputs of NOR 421, the output of which controls NOR 423. The output of NOR 423 is connected to reset input terminals of Flip-Flop units 395 and 397. With a 1 signal on 423, 395 and 397 set themselves with their terminals 1Z2 and 1Z3 at 1 but after initial reset the signal on 423 is zero.

Termnal 1Z1 of Flip-Flop 413 is connected to the input of NOR 431 which is connected to the input of NOR 433. The output of 433 is connected to the input of element 395 through a signal holding network 435. Terminal 1Z2 and the output of 433 are similarly connected as inputs to NOR 437, the output of which is connected to the input of NOR 439. The output of NOR 439 is connected to the input of NOR 121 of Flip-Flop unit 397 through a signal-holding network 441.

It is seen that with 191 or 391 in the unstable state, a signal G3 will cause unit 393 to flop from the state in which it is set to the other state and then after signal G3 disappears, to return to the initial state. 395 can only flop for a signal on G3 if there is no signal on 1Z1. 397 can only flop for a signal on G3 if there is no signal both on 1Z2 and 1Z1. Units 393, 395 and 397 control conductors W3 and W4, through NOR's 451 and 453. The output of NOR 451 is connected to W4 and the output of 453 to W3. NOR 451 has three outputs 2Z1, 2Z2 and 1Z3. NOR 453 has three inputs 1Z1, 1Z2 and 2Z3.

Briefly stated, the above described components of the apparatus have the following functions:

The Wien Bridge is balanced to determine the capacity of the capacitors under test.

The Success-Failure Discriminator determines whether a change in one of the variable arms of the bridge has produced a decrease or an increase in the Bridge output. During each trial the Discriminator delivers a continuous 1 signal along line E1 for a success and delivers no signal for a failure. Unless there is a success, the signal on E1 is 0. E2 and E3 are delivered if the output of the bridge is within permissable limits or is substantially 0. E2 and E3 are 0 while disabled and 1 when enabled; that is when a signal is being delivered.

The Clock Unit when enabled delivers 5 successive signals separated by predetermined time intervals as shown in FIG. 8 at terminals C1, C2, C3, C4 and C5 during each trial.

The Sequencing Unit responds to the 5 signals from the Clock Unit to deliver a plurality of signals G1, G2, G3 and G4, when NOR's 53, 59, 67 and 73 are enabled and also G5. These G signals sequence the operation of the apparatus during each trial. The outputs of the G conductors are each 1 during standby; each G signal is manifested as a short zero pulse.

The Y-Counter counts 1 during each trial in which the resistive arm of the Wien Bridge is varied either by adding or subtracting the 1 from the prior setting as directed by the Counter Control Unit and by the Memory Unit. The counting of the Y-Counter is in the binary numbering system, the energized lamps YL indicating the count. Thus with the lamps of Y1 and Y2 energized the count is 3. The Y-Counter is enabled by signal conductor G2.

The X-Counter is the same as the Y-Counter but counts for changes in the phase-variation arm of the bridge.

The Reading Control Unit disables gates G1, G2 and G3 during the first trial. The Reading Control Unit also operates to establish a basis of comparison on which evaluation of the results during successive moves may be based by transmitting a G4 signal through G2 to set the Y and X-Counters.

The Change of Status Unit resets the apparatus in response to an abnormal number of successes. This occurs when YP1 is 0, that is after the first failure after the first move (1M2 is 1), and when T7 is 0. In this case V1 produces V2 which resets the apparatus. T7 is 0 either if W4 is 1 and W8 and F are 0 (last move was a success) or if W3 is 1 and W7 and S are 0 (last move was a failure).

The Success-Failure Generator produces success and failure signals S and F respectively. During each move, the Generator sets itself. On the receipt of a signal on E1 a success signal S is generated when G1 is impressed. This signal is a continuous 1. When during a move E1 is 0 a failure signal F appears.

The Counter Control Unit is controlled by the Success-Failure Generator and controls in part the Y-Counter and the X-Counter to determine whether a count during any move is to be in an adding or a subtracting direction. This unit flops from 0 for W1 and 1 for W2 to 1 for W1 and 0 for W2 or vice versa for each failure.

The Gate Unit produces W8, W7, and T7 signals. W8 is produced when there is a failure. W7 signal is produced when there is a success. A change from failure to success changes W8 to 0 and W7 to 1; a change from success to failure changes W7 to 0 and W8 to 1.

The Memory Unit counts successive failures and transmits signals selectively which determine which of the X and Y-Counters are to count. This selection of the X and Y-Counters determines which of the separate resistors of the arms of the bridge are to be connected into the Bridge circuit thus determining whether small increments or large increments are to be added during each trial. The selection is effected through YP1 through YP4, XP1 and XP2.

The Failure Counter counts failures after the Memory Unit has counted a certain number of Failures so that W5 is 0 and W6 is 1. (2M3 and 2M4 are 0.) Before this happens it is prevented from counting by Units 191 which resets the Units 393, 395, 397 for W5 0 and S 0. When the Failure Counter has operated to a setting such that W3 is 1, T2 is enabled to block, G3, G4, when W7, S, are 0 and E2 is 1. If the setting W4 is 1, T7 is 0 and permits reset when W8 and F are 0 and E2 is 1.

STANDBY

During standby, power is applied to the apparatus. The application of power energizes the apparatus and sets it in a random state. To set the apparatus in readiness to test capacitors, a reset signal V which is an instantaneous 1 is impressed and at the same time the Success-Failure Discriminator is disabled. The V signal produces a V2 signal. The V and the V2 signals set the apparatus as shown in FIGS. 6A through 6G by the crosses. I* is 1, W1 is 1, W2 is 0, 1M1, 1M2, 1M3, 1M4 are 0, 2M1, 2M2, 2M3, 2M4 are 1, YP1 is 1, YP2 through YP4 and XP1 and XP2 are 0, W5 is 0, W6 is 1, W7 is 0, W8 is 1. With a signal on YP1 and no signals on YP2, YP3 and YP4, the NOR components which determine the order of the counting of the Y-Counters are set with the outputs 1S1 through 1S6 and the outputs 1S8 through 1S10 as 1 and 1S7 is 0. The homologous terminals 2S1 through 2S6 have a 1 signal. In the Y-Counters output signals appear on 1Y9 and 1Y8 and in the X-Counter on 1X3. Relays RY9, RY8, and RX3 are then actuated and the associated lamps are energized. Resistances 11 of 64 and 32 ohms or 96 ohms are inserted in R3 of the Bridge and a resistance 13 of 1 ohm is inserted in R2. The reading of the Y-Counter is 0 1 1 0 0 0 0 0 0 or 384 and the reading of X Counter 0 0 0 1 0 0 or 4. The ratio of the 384 to 4 is 96. With the X and Y-Counters so set W9 and W10 are 0, W11 is 1 and T4 is 1.

With T4 0 the input to NOR 101 is 1 its output 0 and the output of NOR 103 is 0, Flip-Flop 105 connected to C1 is then set with the C1 terminal 0 and the other terminal 1, Flip-Flop 107 is then similarly set so that C2 is 0, C3, C4, C5 are similarly 0, the input to NOR 109 is then 1 and its output is 0. This does not affect NOR 101 since T4 is 0 and the input to 101 from T4 is 1. With the C's 0 and I*, 1 the G's are 1.

With a 1 signal on W1 and with the X and Y-Counters set as described above, there is a 1 signal on 1U1 through 1U7 and on 2U1, 2U2, 2U4, 2U5 and 2U6 and 0 signals on 1U8, 1U9 and 2U3. G1 blocks NOR 115 which prevents Flip-Flop 117 from flopping from success to failure or vice versa. G2 prevents the counters X1 through X6 and Y1 through Y10 from counting. G3 blocks NOR's 117 of the Memory Unit and prevents Flip-Flops 119 from operating. G3 similarly blocks the Success-Failure Counter through NOR's 121 and 123. In the same way, G3 blocks NOR 125 preventing Flip-Flop 127 from changing the normal W8 signal to a W7 signal. G4 blocks NOR 131 preventing any change in Flip-Flop 133. During standby then 133 continues to deliver signal I*. G4 also blocks NOR 135 enabling NOR 137. G5 causes signal lamps connected to NOR's 141 and 143 to remain off.

During standby Flip-Flop 117 will assume a random state. Assume that F is 1 and S 0. This leaves W8 1 and W7 0.

During standby Flip-Flops 413 assume a random state. Assume that 2Z1 and 2Z2 and 1Z3 are 1 and 1Z1, 1Z2, and 2Z3 0. W4 is then 0 and W3 is 1. The inputs to 315 are then 0, the inputs to 307 0, and T7 is 0. T2 is 0, because E2 is 0 and T3 is 1. T7 being 0 has no effect because YP1 is 1.

OPERATION

Preliminary Move

With the apparatus set as just described and a capacitor C1 to be tested connected into the Wien Bridge circuit and the Success-Failure Discriminator is turned on. This Discriminator produces a sync signal s which produces an error signal e1 (see Wendt application). The sync signal s produces a signal at I.

The signal I reduces the output of NOR 145 to 0 raising the output of NOR 103 to 1. This causes a signal C1 to appear. Signals C2, C3, C4 and C5 then appear in succession. The signaling component 147 of the Sequencing Unit which produces C5 then delivers no signal to input 109, the output of 109 is then 1 which causes a 0 signal to be delivered by 101. At this time the I signal which is an instantaneous pulse has disappeared so that the Clock Unit is turned off after producing one set of signals C1 through C5. At this time signal I* is 1 so that signals C1 through C3 have no effect on signals G1 through G3 respectively. Signal G4 becomes momentarily 0 and since the other input from Flip-Flop 133 to NOR 131 is also 0 the output of 131 is 0 and Flip-Flop 133 operates to eliminate the signal I* and to produce a signal at the input to 131 blocking Flip-Flop 133 in its last set condition. G1, G2 and G3 are now conditioned to be influenced by C1, C2 and C3 respectively on the first move. At time C4 there is also a G2 signal through NOR 137. G2 flops Y7 actuating RY7 so that 16 ohms are added and R3 becomes 112. The preliminary trial or move has now been completed. The new Y reading is 0 1 1 1 0 0 0 0 0 or 448.

First Move

The sync signal s now produces a new error signal e2 corresponding to the new setting and the time intervals between s and e1 and s and e2 are compared in the Discriminator. Assume that the time interval between s and e2 is shorter than the time between s and e1. In this case, a signal E1 appears. Snycs also again actuate the Clock Unit and now signals G1, G2, G3, G4, and G5 are conditioned to appear in succession. These signals are instantaneous 0. Their effects may be considered one by one.

An E1 signal produces 0 output on Flip-Flop 157, 1 output on 159, 0 output on 165 and 1 output on 153. The output on 155 is then 0 and at instant C1, G1 flops 117 so that S becomes 1 and F 0. G1 has no effect on 169 so that W1 remains 1 and W2 0. When S becomes 1 401 has output 0, 189 output 1. When F becomes 0 the output of 181 becomes 1 and the output of 185 0.

S blocks 149 at time C2 so G2 does not pass.

YP1 blocks 277 so G3 has no effect on 275. G3 causes units 191 and 391 of the Failure Counter to flop leaving the Failure Counter in its initial setting with 1Z1, 1Z2, 2Z3 at 0 and 2Z1, 2Z2 and 1Z3 at 1. At instant C3, G3 also flops W8 to 0 and W7 to 1. When W7 becomes 1 it blocks NOR 181 since S blocks NOR 183, 185 has 1 output blocking NOR 187. Unit 391 then returns to the state in which 2F is 0. Similarly, NOR 189 blocks Unit 191. Units 393, 395, and 397 remain in their last settings and W3 is 1 and W4 is 0. T7 is then 1 and T2 0 and G4 is conditioned to pass at time C4.

F is 0 but the 1 from 2M1 in the Memory Unit causes the output of 341 to be 0. G3 then causes M1 to flop from 1M1 0 and 2M1, 1 to 1M1 1 and 2M1 0. 1V1 then becomes 1.

Since the output of 149 is 0, 137 is conditioned to pass a signal.

G4 has no effect on I* because 271 is self-blocking. But G4 does produce a signal G2 at time C4. With W1, 1 and W2, 0 and a signal on 1Y7 (Y7 was flopped over in the preliminary move), the output of 1U7 is 0, the output of 1S8 is 0, the output of 1S9 0 and the output of 1S10 is 0. Now on the occurrence of the G2 signal, a 1 output appears at 2Y7, a 1 output at 2Y8, a 1 output at 2Y9 and a one output at 1Y10. Relays RY7, RY8 and RY9 have been deenergized and RY10 has been energized. Resistance of 64 ohms, 32 ohms and 16 ohms have now been replaced by 1 resistance of 128 ohms. It is seen that an addition 16 ohms has been added to the resistance arm. The new reading of the Y-Counter is 1 0 0 0 0 0 0 0 0 or 512. The first trial or move has now been completed.

Second Move

Now the sync pulse s in the Succes-Failure Discriminator triggers another error pulse e3. Assume that the interval between s and e3 is greater than between s and e2. A failure has then occurred and there is a 0 signal on E1. The output of 161 then becomes 1 the output of 165 0 and 167 is conditioned to be triggered by G1.

The sync pulse s also produces a signal at I causing the Clock to produce signals C1, C2, C3, C4 and C5. C1 produces signal G1. G1 flops 169 so that W1 becomes 0 and W2 1. NOR 115 then actuates Flip-Flop 117 so that S becomes 0 and F 1.

With the appearance of an F signal on the input of NOR 173 of the Gate Unit, the output of 173 became 0, the output of 175 1, the output of 177 0 and the output of 125 1. Flip-Flop 127 is then conditioned to flop when signal G3 appears. With F, 1, 1V1 becomes 0 and 357 is unblocked. With S, 0, the output of 189 is 0. With 191 is then conditioned to flop for G3.

With S, 0 a G2 signal appears at time C2. Since W2 is now 1, 1U7, 1U8, and 1U9 become 0 and the Y-Counter sets itself on the last successful setting of 112 ohms. This is a temporary setting.

At time C3 G3 causes M2 in the Memory Unit to flop. 1M2 then becomes 1 and 2M2 0. M1 also flops back to its initial setting but this has no present effect on the Memory Unit. (In the Failure Counter 1M1 is 1 when G3 is impressed.) The flopping of M2 causes YP1 to become 0 and YP2 to become 1.

In the Failure Counter G3 causes unit 191 to flop. 1F then becomes 1, 2Z1 0 and 1Z1 1. 2Z2 and 2Z3 remain 0 and 1Z2 and 1Z3 1. W3 and W4 become 0.

G3 also causes 127 to flop. W8 becomes 1 and W7 0. Unit 191 returns to its stable setting with 1F 0 when G3 becomes 1. With W3 0, T7 becomes 1 preventing flopping of 275 later in the optimizing operation. T2 remains 0.

G4 now again appears at time C4 causing G2 to appear again. This causes Y5 to flop adding resistance of 4 ohms to the 112. Now R3 is 116 ohms. The reading of the Y-Counter is now 0 1 1 1 0 1 0 0 0. The second move has now been completed.

Third Move

Assume that the third move is a success. E1 then appears. The output of 167 is then 0 and when G1 appears W2 remains 1 and W1 0. When G1 appears F becomes 0 and S 1. G2 is then blocked.

1V1 in the Memory Unit is now 1, 1V2 is 1 and 1V3 0 so that 358 and 361 are blocked.

With W7 and F both 0, NOR 185 of the Failure Counter has 0 output and 391 flops for G3. With 1M1 0 and S 1 unit 191 remains unchanged. With 2F 1, 1Z1 becomes 0 and 2Z1 1. 2Z2 and 2Z3 remain 0 and 1Z2 and 1Z3 1. W3 and W4 remain 0.

G3 also flops W8 to 0 and W7 to 1. Unit 391 is then reset. T7 remains 1.

At time C4, G4 enables G2. G2 flops Y5 back to 0 for 1Y5 and flops Y6 to 1 for 1Y6. The 4 ohm resistance is now replaced by 8 ohms. The total resistance of R3 is now 120 ohms. The reading of the Y-Counter is now 0 1 1 1 1 0 0 0 0 or 480. The third move is now complete.

*Fourth Move*

Assume the fourth move is a failure. G1 then flops 169 so that W2 is 0 and W1 is 1. F becomes 1 S 0. G2 returns the Y-Counter to the prior successful setting 116 ohms. In the Memory Unit at time C3, M1 flops to 1M1 0 and 2M1 1, M2 flops to 1M2 0 and 2M2 1, M3 flops to 1M3 1 and 2M3 0. YP3 then becomes 1 and YP2 0. In the Failure Counter 191 flops, 1F becoming 1. The terminals of 393, 395, 397 are then as follows.

$$2Z1=0$$
$$1Z1=1$$
$$2Z2=0$$
$$1Z2=1$$
$$2Z3=0$$
$$1Z3=1$$

G3 also flops 127 from W7 1 to W8 1.

G4 triggering G2 at time C4 causes Y3 to flop actuating RY3 and adding 1 ohm so that R3 becomes 117 ohms. The reading of Y-Counter is now 0 1 1 1 0 1 0 1 0 0 or 468.

From the above operational description the operation of the apparatus will be understood. The function of several of the signal lines may be considered briefly. W11 is 0 under the following circumstances:

RY10 and RY9 _____ Actuated
RY10 and RY9 and RY8 _____ Unactuated
RX2, RX3, RX4 and RX5 _____ Unactuated
RX6 _____ Actuated If any of these happens and if in addition W5 is 0 (Memory Unit in its lower stages) T4 becomes 1 and the Clock Unit passes through a second cycle without actuation by I. This cycle simulates failure, since G1 causes W1 and W2 to change during the second cycle. If W11 becomes 0 during the later stages of the Memory Unit when W6 is 0, T5 becomes 1 and the lamp connected to NOR 143 is energized.

If—
    W4 is 1
    W8 is 0
    F is 0 (Failure following success)
    E2 is 1

T7 becomes 0 and if now YP1 is 0, G3 causes V2 to reset the apparatus.

If—
    W3 is 1
    W7 is 0
    S is 0 (Success following failure)
    E2 is 1

T2 becomes 1 blocking G3 and G4. In this case the lamp connected to T3 through NOR 141 is energized.

While a preferred embodiment of this invention has been disclosed many modifications thereof are feasible. This invention then is not to be restricted except as is necessitated by the spirit of the prior art.

We claim as our invention:

1. The method of balancing an alternating-current bridge having input terminals between which an alternating-current potential is impressed and output terminals from which an error signal dependent on the unbalance of the bridge is derived, said error signal being distinguished only by changes in amplitude, said bridge also having a variable-resistance arm and a variable phase-angle arm, the said method comprising varying one of said arms only, after each said variation determining the error signal, comparing said last-named error signal with the prior lowest error signal determined following prior variations of said one arm, rejecting said prior lowest error signal and storing said last-named error signal in its place in a condition to be compared with later error signals, said last-named signal being stored only if said last-named error signal is lower than said prior lowest error signal otherwise rejecting said last-named error signal and positively reverting the setting of said one arm to its setting prior to the variation which produced said last-named error signal, continuing said variation of said one of said arms until said error signal following a variation is a first minimum, storing said minimum error signal, in a condition to be compared with later error signals, thereafter varying said other arm only, after each said variation of said other arm determining the error signal, comparing said last-named error signal with the prior lowest error signal determined following prior variations of said one and said other arm, rejecting said prior lowest error signal and storing said last-named error signal in its place in a condition to be compared with later error signals, said last-named signal being stored only if said last-named error signal is lower than said prior lowest error signal otherwise rejecting said last-named error signal and positively reverting the setting of said other arm to its setting prior to the variation which produced said last-named error signal, continuing said variation of said other arm until said error signal is a second minimum less than said first minimum, storing said second minimum error signal, in a condition to be compared with later error signals, and repeating the above described variation of said one arm and then said other arm respectively in the aforesaid succession until said error signal is substantially zero within the limits of error.

2. The method of balancing an alternating-current bridge having input terminals between which an alternating-current potential is impressed and output terminals from which an error signal dependent on the unbalance of the bridge is derived, said error signal being distinguished only by changes in amplitude, said bridge also having a variable-resistance arm and a variable phase-angle arm, the said method comprising varying said resistance arm only, after each said variation determining the error signal, comparing said last-named error signal with the prior lowest error signal determined following prior variations of said resistance arm, rejecting said prior lowest error signal and storing said last-named error signal in its place in a condition to be compared with later error signals, said last-named signal being stored only if said last-named error signal is lower than said prior lowest error signal otherwise rejecting said last-named error signal and positively reverting the setting of said resistance arm to its setting prior to the variation which produced said last-named error signal, continuing said variation of said resistance arm until said error signal is a first minimum, storing said minimum error signal in a condition to be compared with later error signals, thereafter varying said phase-angle arm only after each said last-named variation determining the error signal, comparing said last-named error signal with the prior lowest error signal determined following prior variations of said resistance arm and said phase-angle arm, rejecting said prior lowest error signal and storing said last-named error signal in its place in a condition to be compared with later error signals, said last-named signal being stored only if said last-named error signal is lower than said prior lowest error signal otherwise rejecting said last-named error signal and positively reverting the setting of said phase-angle arm to its setting prior to the variation which produced said last-named error signal, continuing said variation of said phase-angle arm until said error signal is a second minimum less than said first minimum, storing said second minimum error signal in a condition to be compared with later error signals, said last-named signal being stored and repeating the above described variation of said resistance arm and then said phase-angle arm respectively in the aforesaid succession until said error signal is substantially zero within the limits of error.

3. The method of balancing an alternating-current bridge having input terminals between which an alternating-current potential is impressed and output terminals from which an error signal dependent on the unbalance of the bridge is derived, said error signal being distinguished only by changes in amplitude, said bridge also having a variable-resistance arm and a variable phase-angle arm, the said method comprising changing one of said arms by successive increments of a first magnitude having a first polarity and following each said change storing the error signal in a condition to be compared with later error signals until an error signal is produced which is at least as high as said stored error signal in response to changes in said one arm of said first polarity, said first polarity being identified as the polarity for which at least the first of said increments produces a decrease in said error signal, retaining said stored error signal in a condition to be compared with later error signals, thereafter changing said one arm only by successive increments of a second magnitude smaller than said first magnitude having a second polarity opposite to said first polarity and following each last-named change storing the error signal in a condition to be compared with later error signals until a second error signal in response to a change in said one arm of said opposite polarity is produced which is at least as high as the error signal stored for the just preceding change, storing said error signal for said just preceding change in a condition to be compared with later error signals, thereafter repeating the change of said one arm only by successions of successive increments, each succession being started following a failure to decrease of said error signal and the magnitude of the increments of each succession being smaller than the magnitude of the just preceding succession and the polarity of the increments of each succession being opposite to the polarity of the increments of the just preceding succession, lower error signals only being stored following each change, the changes in said one arm only being discontinued on the occurrence of a failure to decrease of said error signal following the change of said one arm only by a succession of successive increments having a predetermined minimum magnitude and thereafter repeating the above described sequence of operation by changing said other arm as aforesaid.

4. The method of balancing an alternating-current bridge having input terminals between which an alternating-current potential is impressed and output terminals from which an error signal dependent on the unbalance of the bridge is derived, said error signal being distinguished only by changes in amplitude, said bridge also having a variable-resistance arm and a variable phase-angle arm, the said method comprising changing resistance arm by successive increments of a first magnitude having a first polarity and after each said change storing the error signal in a condition to be compared with later error signals, said changes continuing until a change produces an error signal at least as high as the stored error signal, said first polarity being identified as the polarity for which at least the first of said increments produces a decrease in said error signal, retaining said stored error signal in a condition to be compared with later error signals, thereafter changing said resistance arm only by successive increments of a second magnitude smaller than said first magnitude having a second polarity opposite to said first polarity and following each said last-named change storing the error signal in a condition to be compared with later error signals, said changes continuing until a change produces an error signal which for the second time is at least as high as the error signal stored for the just preceding change, retaining said last-named stored error signal in a condition to be compared with later error signals, thereafter repeating the change of said resistance arm only by successions of successive increments, each succession being started following a failure to decrease at said error signal and the magnitude of the increments of each succession being smaller than the magnitude of the just preceding succession and the polarity of the increments of each succession being opposite to the polarity of the increments of the just preceding succession, the changes in said resistance arm only being discontinued on the occurrence of a failure to decrease of said error signal following the change of said resistance arm only by a succession of successive increments having a predetermined minimum magnitude, and thereafter repeating the above described sequence of operation by changing said phase-angle arm as aforesaid.

5. Apparatus for determining the impedance of a reactive element such as a capacitor comprising an alternating current bridge having an arm including means for connecting said element, impedance arm including means for setting said arm in accordance with the range of impedance of each element to be tested, a variable-resistance arm, a variable phase-angle arm, conjugate input terminals, and conjugate output terminals, said variable resistance arm including a plurality of resistors each shunted by first closed contact means, said phase-angle arm including a plurality of resistors each shunted by second closed contact means, means connected to said input terminals for impressing an alternating potential therebetween, first conditioning means connected to said first contact means for conditioning said first conact means to be opened, second conditioning means connected to said second contact means for conditioning said second means to be opened, means connected to said output terminals, to said first contact means and to said second contact means and responsive only to the magnitude of the potential between said output terminals when said alternating potential is impressed between said input terminals for selectively opening whichever of said contact means is conditioned by the associated conditioning means so that said magnitude of said potential between said output terminals is reduced to a low magnitude, and means connected to said first and second conditioning means and responsive only to said magnitude of said potential between said output terminals for conditioning said first and second contact means alternately as during progressive decrease of said last-named magnitude, said last-named magnitude reaches points where changes in the conditioned contact means produces no decrease in said last-named magnitude.

6. An alternating-current bridge for determining the impedance of a reactive element such as a capacitor comprising a first arm including means for connecting said element in said first arm, a second arm having a plurality of impedances each shunted by first selectively operable contact means, said first contact means to be set in accordance with the range of reactance of said element, a variable resistance arm having a plurality of resistors each shunted by selectively operable second contact means, a variable phase-angle arm having a plurality of resistors each shunted by selectively operable third contact means, input and output conjugate terminals, operating means responsive only to the magnitude of the potential across said output conjugate terminals and connected to said second and third contact means for operating only one of said contact means at a time, and means responsive only to said magnitude of said potential and connected to said operating means for operating said contact means alternately, one of said contact means being operated until said magnitude is reduced to a point at which no further decrease in said magnitude takes place for operation of said one contact means and then the other contact means being operated until said magnitude is reduced to a point at which no further decrease in said potential takes place for operation of said other contact means, and then said one contact means and then said other contact means is operated as aforesaid.

7. An alternating-current bridge for determining the impedance of a reactive element such as a capacitor comprising a first arm including means for connecting said element in said first arm, a second arm to be set in accordance with the range of reactance of said element, a variable resistance arm having a plurality of resistors each shunted by selectively operable second contact means, a variable phase-angle arm having a plurality of resistors each shunted by selectively operable third contact means, input and output conjugate terminals, operating means responsive only to the magnitude of the potential across said ouput conjugate terminals and connected to said second and third contact means for operating only one of said contact means at a time, and means responsive only to the magnitude of said potential and connected to said operating means for operating said contact means alternately, one of said means being operated until said magnitude of said potential is reduced to a point at which no further decrease in said magnitude takes place for operation of said one contact means and then the other contact means being operated until said magnitude of said potential is reduced to a point at which no further decrease in said magnitude takes place for operation of said other contact means, and then said one contact means and then said other contact means is operated as aforesaid.

8. The method of balancing an alternating-current bridge having input terminals between which an alternating-current potential is impressed and having output terminals from which is derived an error signal dependent in magnitude only on the unbalance of the bridge, said bridge also having a variable-resistance arm and a variable-phase arm, the said method comprising varying alternately, each in its turns, one of said arms only and then the other of said arms only, by increments, the polarity of the variation of each arm in its turn being maintained so long as each successive variation results in a reduction of said magnitude and being reversed following any variation which results in no increase in said magnitude, the increment of variation being reduced on each reversal of polarity, the variation of said last-named arm being discontinued following failure of a plurality of successive variations of said last-named arm to result in a decrease in said magnitude, said discontinuing being followed by variation of said other arm, each reduced magnitude of said error signal being stored in a condition to be compared with the magnitudes resulting from subsequent variations of said arms, each variation immediately following each change of polarity starting from the setting of the associated arm just prior to the variation of said arm which resulted in no decrease in said error signal.

9. The method of balancing an alternating-current bridge having input terminals between which an alternating-current potential is impressed and having output terminals from which is derived an error signal dependent in magnitude only on the unbalance of the bridge, said bridge also having a variable-resistance arm and a variable-phase arm, the said method comprising varying alternately, each in its turns, one of said arms and then the other of said arms, by increments, the polarity of the variation of each arm in its turn being maintained so long as each successive variation results in a reduction of said magnitude and being reversed following any variation which results in no increase in said magnitude, the increment of variation being reduced on each reversal of polarity, the variaion of said last-named arm being discontinued following failure of a plurality of successive variations of said last-named arm to result in a decrease in said magnitude, said discontinuing being followed by variation of said other arm, each reduced magnitude of said error signal being stored in a condition to be compared with the magnitudes resulting from subsequent variations of said arms, each variation immediately following each change of polarity starting from the setting of the associated arm just prior to the variation of said arm which resulted in no decrease in said error signal.

10. Apparatus for determining the impedance of a reactive element such as a capacitor comprising an alternating current bridge having an arm including means for connecting said element, an impedance arm including means for setting said impedance arm in accordance with the range of impedance of each element to be tested, a variable-resistance arm, a variable phase-angle arm, conjugate input terminals, and conjugate output terminals, means connected to said input terminals for impressing an alternating potential therebetween, first conditioning means connected to said variable resistance arm for conditioning said variable resistance arm to be varied, second conditioning means connected to said phase-angle arm for conditioning said phase-angle arm to be varied, means connected to said output terminals, to said variable resistance arm and to said phase-angle arm and responsive only to the magnitude of the potential between said output terminals when said alternating potential is impressed between said input terminals for selectively varying whichever variable arm is conditioned by the associated conditioning means so that said magnitude of said potential between said output terminals is reduced to a low magnitude, and means connected to said first and second conditioning means and responsive only to said magnitude of said potential between said output terminals for conditioning said variable resistance arm and said phase-angle arm alternately as during progressive decrease of said last-named magnitude, said last-named magnitude reaches points where changes in the conditioned variable arm produces no decrease in said last-named magnitude.

References Cited in the file of this patent
UNITED STATES PATENTS

| | | |
|---|---|---|
| 1,705,561 | Edwards et al. | Mar. 19, 1929 |
| 1,751,538 | Wunsch | Mar. 25, 1930 |
| 2,369,070 | Nielson | Feb. 6, 1945 |
| 2,440,200 | Jofeh | Apr. 20, 1948 |
| 2,484,573 | Kezer | Oct. 11, 1949 |
| 2,490,844 | Sorensen | Dec. 13, 1949 |
| 2,625,587 | Kempf | Jan. 13, 1953 |
| 2,629,843 | Berry | Feb. 24, 1953 |
| 2,639,411 | Schafer | May 19, 1953 |
| 2,681,431 | Wannamaker | June 15, 1954 |
| 2,769,958 | Meadows et al. | Nov. 6, 1956 |

OTHER REFERENCES

Alternating Current Bridge Methods (text book), Hague, Sir Issac Putnam and Sons, Ltd., 1957, pages 297–303.

Test Instruments, July 1956, pages 55–57.